United States Patent
Slade et al.

(10) Patent No.: US 12,427,996 B1
(45) Date of Patent: Sep. 30, 2025

(54) WIRELESS VEHICLE COMMUNICATION SYSTEM

(71) Applicant: Grote Industries, Inc., Madison, IN (US)

(72) Inventors: Adam Slade, Madison, IN (US); Cesar Perez-Bolivar, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 229 days.

(21) Appl. No.: 17/952,388

(22) Filed: Sep. 26, 2022

Related U.S. Application Data

(60) Provisional application No. 63/248,567, filed on Sep. 27, 2021.

(51) Int. Cl.
*B60W 40/10* (2012.01)

(52) U.S. Cl.
CPC ......... *B60W 40/10* (2013.01); *B60W 2300/14* (2013.01); *B60W 2420/408* (2024.01)

(58) Field of Classification Search
CPC ........... B60W 40/10; B60W 2420/408; B60W 2300/14
See application file for complete search history.

(56) References Cited

U.S. PATENT DOCUMENTS

| | | | |
|---|---|---|---|
| 7,961,086 B2 | 6/2011 | Bradley | |
| 8,436,747 B2 | 5/2013 | Schoepp | |
| 9,020,683 B1 * | 4/2015 | Johnson | B62D 59/00 |
| | | | 701/33.1 |
| 2005/0016787 A1 * | 1/2005 | Lesesky | H04B 10/1143 |
| | | | 180/311 |
| 2005/0062590 A1 * | 3/2005 | Lang | B60D 1/62 |
| | | | 340/431 |
| 2017/0109997 A1 * | 4/2017 | Brooks | B60Q 11/005 |
| 2017/0186327 A1 * | 6/2017 | Uysal | H04L 51/222 |
| 2019/0232962 A1 * | 8/2019 | Broll | H04W 4/46 |
| 2020/0041609 A1 * | 2/2020 | Ames | H04B 10/1143 |
| 2020/0213028 A1 * | 7/2020 | Behringer | H04B 10/11 |

FOREIGN PATENT DOCUMENTS

WO   WO 2013/101071 A1   7/2013

* cited by examiner

*Primary Examiner* — Aaron L Troost
(74) *Attorney, Agent, or Firm* — Woodard Emhardt Henry Reeves & Wagner LLP

(57) ABSTRACT

A communication system for a truck and trailer that may include trailer components electrically connected to a modulation unit. The modulation unit may be configured to encode trailer-related data values representing aspects of the trailer components such as operational status, failure of internal components, component operating parameters, and the like. The communication system may also include one or more light emitters responsive to the modulation unit that may be arranged and configured to direct light away from the trailer and toward one or more sensors electrically connected to demodulation units. The sensors may be responsive to the modulated light emitted by the emitters and the demodulation units may be useful to decode and obtain the trailer-related data values.

28 Claims, 9 Drawing Sheets

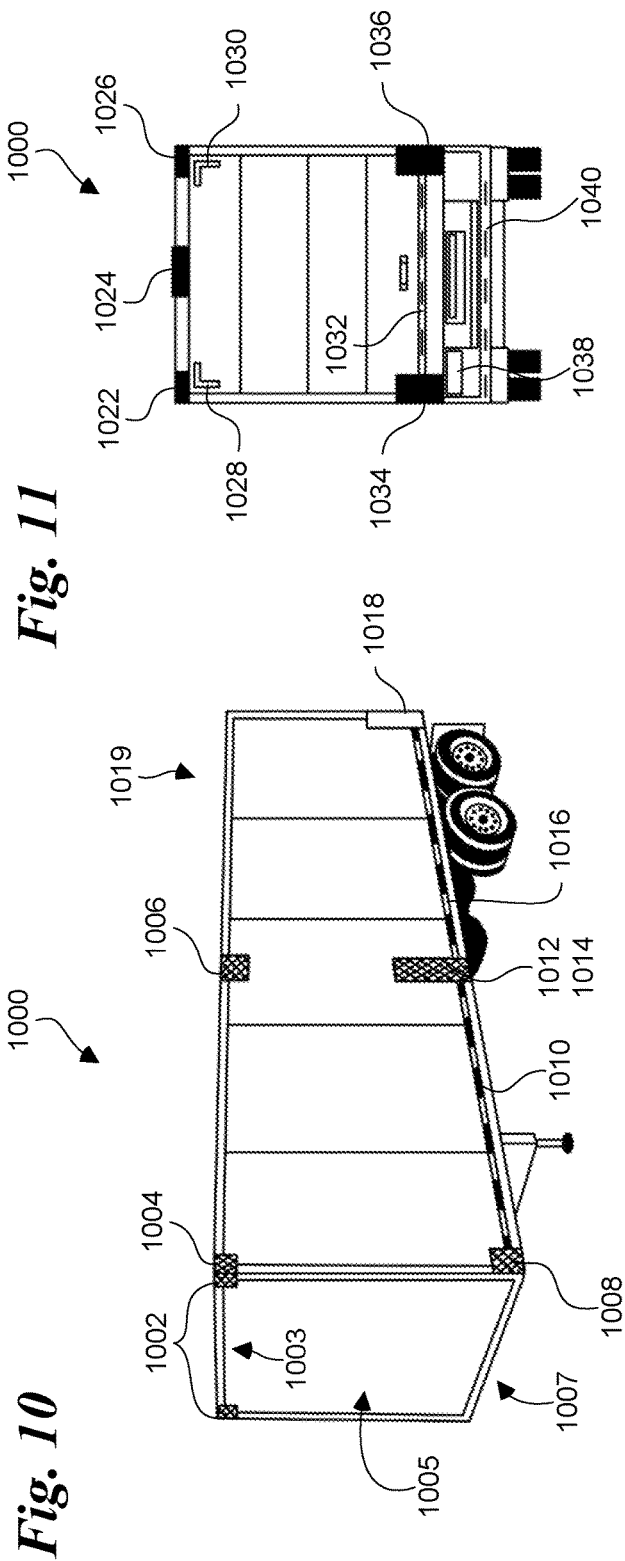
Fig. 11
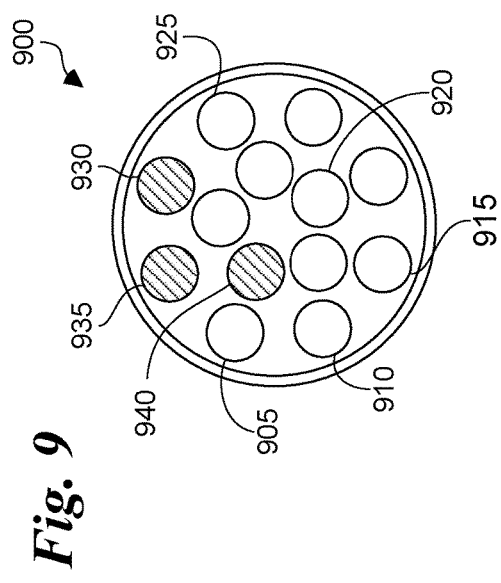
Fig. 9
Fig. 10

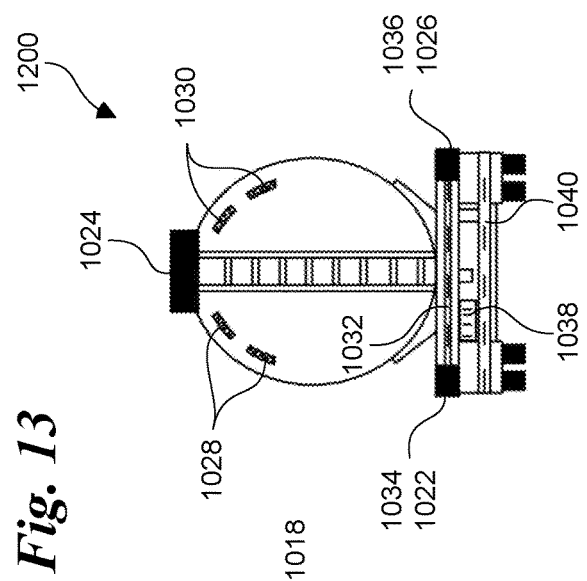
Fig. 12
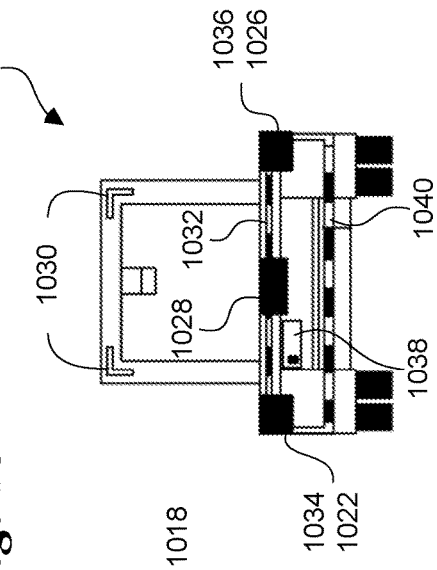
Fig. 13
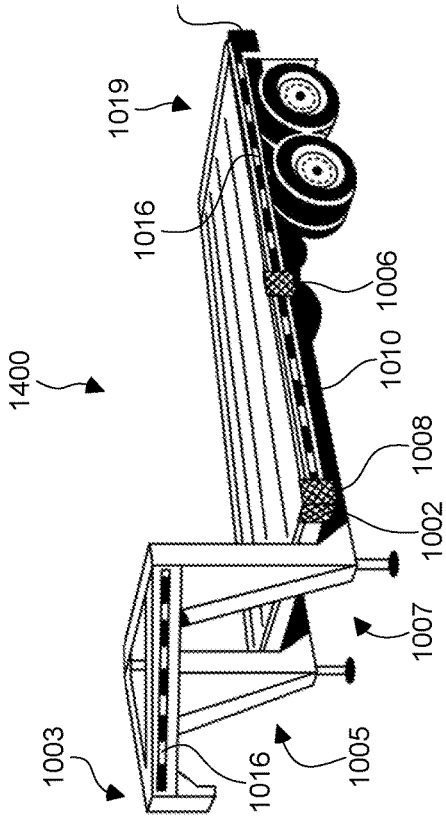
Fig. 14
Fig. 15

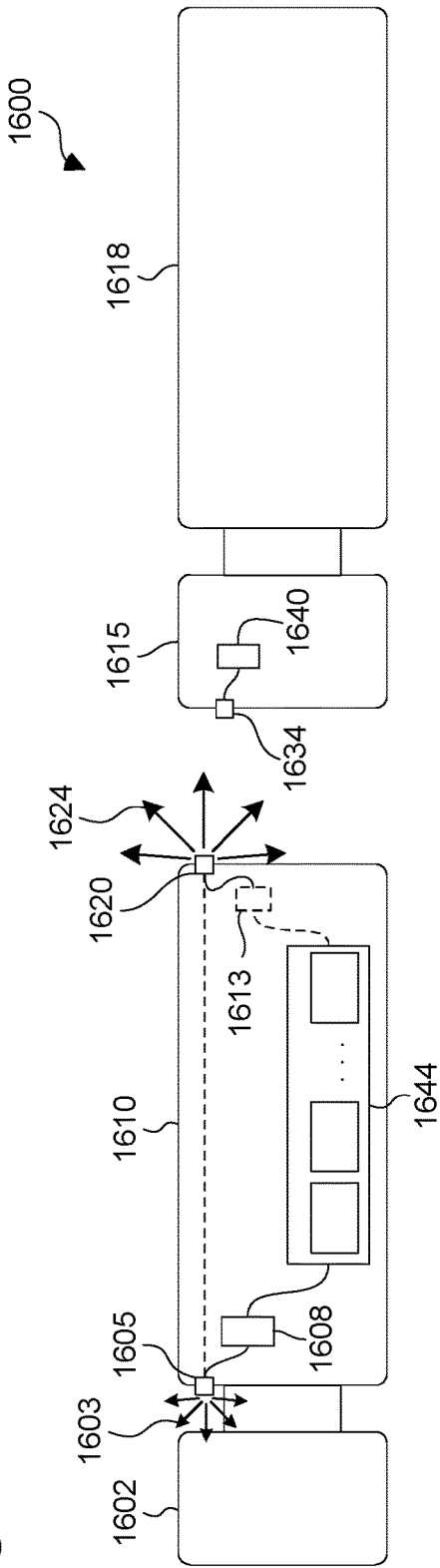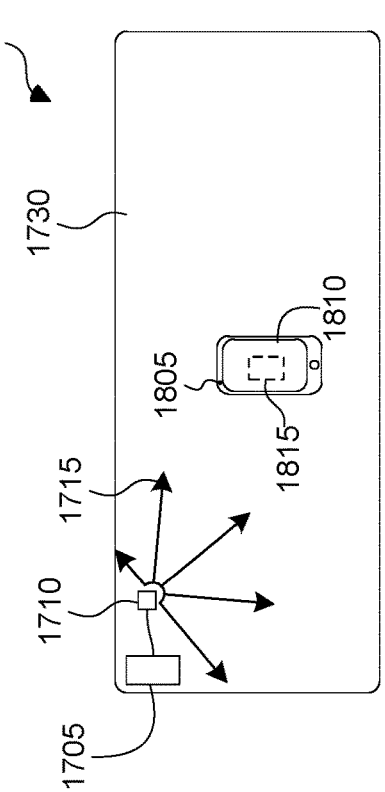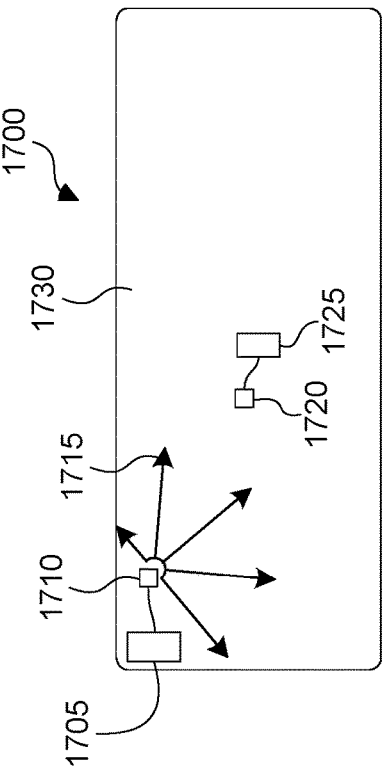
*Fig. 16*
*Fig. 17*
*Fig. 18*

WIRELESS VEHICLE COMMUNICATION SYSTEM

CROSS-REFERENCE TO RELATED APPLICATION

This application claims the benefit of U.S. Provisional Patent Application No. 63/248,567 filed Sep. 27, 2021, which is hereby incorporated by reference.

BACKGROUND

The present disclosure relates generally to a communication system for a truck trailer that uses modulated light to communicate information about the trailer. As trailer technology advances, the quantity and type of data moving between the truck and trailer has made it increasingly difficult to move data to and from the trailer using existing wired connections traditionally used only for carrying power. Also, existing communication systems may be easily overloaded with new information as the overall volume increase. In many cases, alternative communication systems for obtaining information from a trailer can be expensive and complicated, particularly when retrofitting them to existing trailers and trucks.

SUMMARY

Disclosed is a communication system for a truck and trailer that may include at least one trailer component mounted to the trailer, and a modulation unit responsive to the at least one trailer component. The modulation unit may be configured to encode trailer-related data values representing operational aspects of the at least one trailer component sent to the modulation unit. The communication system may also include a front-facing light emitter responsive to the modulation unit that is optionally arranged and configured to direct forward-biased light away from the front of the trailer toward the truck. The front-facing light emitter may be configured to change at least one aspect of the forward-biased light according to the encoded trailer-related data values received from the modulation unit. In another aspect, communication system may include a rear-facing light sensor facing toward the trailer and responsive to changes of the at least one aspect of the forward-biased light. In another aspect, the system optionally includes a demodulation unit responsive to the rear-facing light sensor. The demodulation unit may be configured to decode the trailer-related data values representing the operational aspects of the at least one trailer component.

In another aspect, the trailer-related data values may include values indicating that the at least one trailer component is malfunctioning. In another aspect, the at least one trailer component may be a vehicle tail lamp having multiple LEDs, and the trailer-related data values optionally include values indicating that at least a portion of the multiple LEDs has failed. In another aspect, the at least one trailer component may include one or more of a vehicle stop-tail-turn lamp, vehicle clearance lamp, vehicle turn signal lamp, vehicle brake lamp, vehicle tail lamp, vehicle running lamp, vehicle anti-lock brake system, vehicle interior illumination lamp, vehicle reverse lamp, pressure sensor, temperature sensor, door sensor, cargo sensor, cargo length sensor, liquid level sensor, refrigeration sensor, or any combination thereof.

In another aspect, the front-facing light emitter may include an LED mounted to the front of the trailer arranged and configured to direct light toward the truck. In another aspect, the LED may be part of a vehicle clearance lamp assembly, vehicle clearance lamp, vehicle turn signal lamp, vehicle running lamp, or other lamp which may be mounted to the front of the trailer. In another aspect, the LED may be configured to emit light that is visible to humans. In another aspect, the LED may be configured to emit light at multiple frequencies or colors intermittently, simultaneously, or any combination thereof. For example, the light emitter may be configured to emit ultraviolet or infrared light, or any combination thereof. In another aspect, the at least one aspect of the light emitted by the front-facing light emitter includes a wavelength of the forward-biased light. In another aspect, the at least one aspect of the light emitted by the front-facing light emitter includes the current supplied to the front-facing light emitter. In another aspect, the at least one aspect of the light emitted by the front-facing light emitter includes the intensity of the forward-biased light.

In another aspect, the trailer-related data values may be generated by a communication circuit in the at least one trailer component. The at least one trailer component may be electrically connected to the modulation unit by a wire, or wirelessly, or any combination thereof. In another aspect, the trailer-related data values may be generated by a communication circuit included in a socket electrically connecting the at least one trailer component to the modulation unit. In another aspect, the front-facing light emitter is arranged and configured to emit pulses of light in a sequence corresponding to the encoded trailer-related data values.

In another example, the disclosed communication system optionally includes a truck controller configured to send command-related data values representing commands to the at least one trailer component. The system may also include a second modulation unit responsive to the truck controller. The second modulation unit may be configured to encode command-related data values representing commands sent from the truck controller to optionally be delivered to the at least one trailer component. The system may also include a rear-facing light emitter arranged and configured to direct rear-biased light away from the rear of the truck toward the trailer. The rear-facing light emitter may be configured to change at least one aspect of the rear-biased light according to the encoded command-related data values received from the second modulation unit. The system optionally further includes a front-facing light sensor facing toward the rear of the truck that may be responsive to changes of the at least one aspect of the rear-biased light. In another aspect, system may include a second demodulation unit responsive to the front facing light sensor that is optionally configured to decode the command-related data values representing the commands to the at least one trailer component.

In another aspect, power may be supplied to the at least one trailer component through a power cable electrically connecting the at least one trailer component to a power source in the truck. In another aspect, the trailer-related data values may include values indicating the status of the power supplied by the power cable to the at least one trailer component. In another aspect, the system optionally includes a rear-facing light emitter configured to direct rear-biased light away from the rear of the trailer. The rear-facing light emitter may be responsive to the modulation unit. In another aspect, a second truck following behind the trailer may have a front facing light sensor mounted on the second truck facing forward of the truck and toward the rear of the trailer. This front facing light sensor may be responsive to changes of at least one aspect of the rear-biased light emitted away from the rear of the trailer. In another aspect, the front-facing light sensor may be mounted in a lamp of the second truck, such as a clearance lamp, headlamp, turn signal lamp, vehicle marker lamp, and the like.

In another aspect, the system optionally includes a truck controller configured to send truck-related data values optionally representing or defining information about the truck to the modulation unit. The modulation unit may be responsive to the truck controller, and the modulation unit is optionally configured to encode truck-related data values representing the information about the truck sent to the modulation unit. In another aspect, the rear-facing light emitter is optionally configured to change at least one aspect of the rear-biased light according to the encoded truck-related data values representing information about the truck. In another aspect, the information about the truck may include any one or more of a speed of the truck, a change in speed of the truck, a level of braking applied, a gross vehicle weight of the truck and trailer, a load weight of the load in the trailer, a location of the truck, a route of the truck, or any combination thereof.

In another aspect, the disclosed communication systems may include an internal light emitter that is optionally responsive to the modulation unit and may be arranged and configured to direct internal light into an interior of the trailer. The internal light emitter may be configured to change at least one aspect of the internal light according to the encoded trailer-related data values received from the modulation unit. In another aspect, the system may include an internal light sensor positioned inside the trailer and responsive to changes of the at least one aspect of the internal light. The communication system may further include an optional demodulation unit responsive to the internal light sensor. The demodulation unit may be configured to decode the trailer-related data values representing the operational aspects of the at least one trailer component. In another aspect, the system may include a personal computing device inside the trailer that optionally includes the internal light sensor and the demodulation unit. In another aspect, the trailer-related data values may include values indicating that the at least one trailer component is malfunctioning. In another aspect, the trailer components may include a vehicle tail lamp having multiple LEDs, and the trailer-related data values may also include values indicating that at least a portion of the multiple LEDs has failed. In another aspect, the disclosed communication system may include trailer components such as a vehicle stop-tail-turn lamp, vehicle clearance lamp, vehicle turn signal lamp, vehicle brake lamp, vehicle tail lamp, vehicle running lamp, vehicle anti-lock brake system, vehicle interior illumination lamp, vehicle reverse lamp, pressure sensor, temperature sensor, door sensor, cargo sensor, cargo length sensor, liquid level sensor, refrigeration sensor, or any combination thereof. In another aspect, the internal light emitter includes an LED mounted inside the trailer as part of an internal trailer lamp assembly. In another aspect, the internal light emitter includes an LED configured to emit light that may be visible or invisible to humans, or any combination thereof. In another aspect, the internal light emitter includes an LED configured to emit infrared light, ultraviolet light, or any combination thereof.

Further forms, objects, features, aspects, benefits, advantages, and examples of the present disclosure will become apparent from the accompanying claims, detailed description, and drawings provided herewith.

BRIEF DESCRIPTION OF THE DRAWINGS

FIG. 9 is one example of a lamp component that may be found in the trailer shown in any of the preceding figures.

FIGS. 10 and 11 illustrate one example of a trailer that may be used in the communication system of any of the preceding figures.

FIGS. 12 and 13 illustrate another example of a trailer that may be used in the communication system of any of the preceding figures.

FIGS. 14 and 15 illustrate yet another example of a trailer that may be used in the communication system of any of the preceding figures.

FIG. 16 is a component diagram illustrating another example of components that may be included in a wireless communication system like the system illustrated in FIG. 1.

FIG. 17-19 are component diagrams illustrating aspects of a wireless communication system that may be included in a system like the system illustrated in FIG. 1.

DETAILED DESCRIPTION

Figure 1:
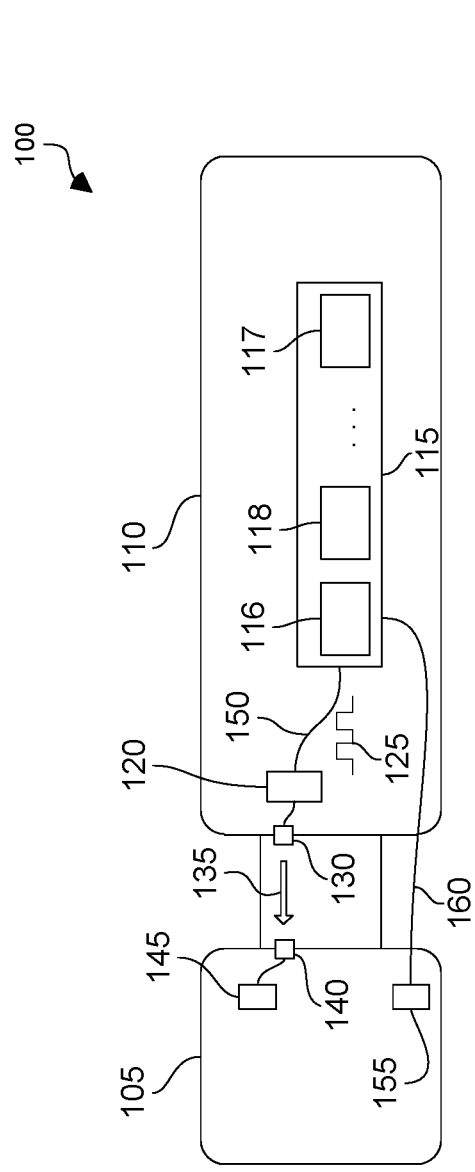
FIG. 1 is a component diagram illustrating one example of components that may be included in a wireless communication system for a truck trailer.

FIG. 1 illustrates at 100 one example of a communication system for a truck trailer. The system may include a truck 105 coupled to a trailer 110. The trailer 110 may include one or more trailer components 115 which may comprise any suitable arrangement of trailer components such as trailer components 116, 117, and 118. The trailer components 115 may be responsive to a modulation unit 120 configured to encode trailer related data values 125 representing operational aspects of the trailer components 115. In one aspect, the modulation unit 120 may be electrically connected to trailer components 115 via communication link 150. Such electrical connection may include a wired, wireless, or other suitable connection, or any combination thereof.

In another aspect, the communication system may include a light emitter 130 responsive to the modulation unit and arranged and configured to direct forward biased light 135 toward truck 105. The forward biased light may include visible or invisible light directed away from the front of the trailer toward the truck. The front facing light emitter may be configured to change at least one aspect of the forward biased light according to the encoded trailer data 125 received by modulation unit 120. Aspects of the forward biased light that may be changed by the light emitter 130 may include, for example, the frequency or color of the light, and/or the intensity or brightness of the light, or any combination thereof any. Modulating the forward biased light 135 may include varying the voltage, current, or power supplied to the light emitter 130. For example, the modulation may involve controlling the light emitter 130 to blink by alternating between an "on" state when the light emitter is activated and emitting light, to an "off" state when the light emitter is deactivated and not emitting light. The "on" state may correspond to a digital "high" signal or "1" in a digital representation of trailer data 125, while the "off" state may correspond to a digital "low" signal or "0" in a digital representation of trailer data 125.

In another aspect, the light emitted may include colors or wavelengths of light visible to humans, and/or it may include ultraviolet or infrared light, or any combination thereof. For example, the "high" state or digital "1" may correspond to one color, while "low" state may correspond to a different color. In another example, the "high" state or digital "1" may correspond to a first intensity of light, while the "0" may correspond to a different second intensity of light that is lower or higher than the first intensity. In another aspect, the light emitter may include a single LED, or multiple LEDs, mounted to the front of the trailer which may be optionally arranged and configured to direct light toward the truck. For example, LEDs of different colors may be used for "1" or "0" digital representation, with the rear facing sensor 140 configured with separate sensors calibrated or otherwise configured to detect the different colors of light accordingly. These are merely examples of different modulation, emitting, and sensing techniques that may be employed as any suitable modulation technique may be used in the transmission of the encoded trailer data 125.

In another aspect, the truck 105 may include a rear facing light sensor that may be configured to face toward the trailer. In another aspect, the rear facing light sensor 140 may be responsive to changes of the at least one aspect of the forward biased light 135. In this way, rear facing light sensor 140 may be configured and arranged to detect the presence of the forward biased light 135 sent by front facing light emitter 130. A demodulation unit 145 may be included that is responsive to the rear facing light sensor 140. The demodulation unit may be arranged and configured to decode the trailer related data values 125 representing operational aspects of the trailer components 115. In another aspect, the emitter 130, sensor 140, modulation unit 120, and demodulation unit 145 may operate as part of a Li-Fi communication system using any suitable configuration of protocols, frequencies of light, intensities of light, and the like to transmit data via modulated light.

In another aspect, the trailer-related data values representing operational aspects may include any suitable operational characteristics of trailer components 115. In one example, the trailer-related data values include values indicating that the at least one trailer component of the trailer components 115 is malfunctioning. For example, the data values may indicate that a backup camera has failed, or is unresponsive. In another example, the data values may indicate out of range values for a pressure, temperature, or weight sensor in the trailer. This may be useful in determining that the sensor has failed, is not properly calibrated, is misaligned or improperly positioned, will soon need replacement, or any combination thereof. In another example, the data values may indicate a loss of pressure in a braking system used to slow the trailer. Other braking-related indications may include a faulty or failed Anti-lock Braking System (ABS) controller or actuators associated therewith. In another example, trailer related data values may include temperature, pressure, load, or other related aspects of a refrigeration unit in the trailer. This may indicate that the refrigeration unit is failing, or that some component of it has failed, needs maintenance, or is nearing end-of-life.

In another aspect, the data values may include operational settings used to configure the operation of the various trailer components such as temperature and pressure settings, operating modes, and the like. For example, a lamp in the trailer may be configured to periodically or on demand report its operating settings such as that the lamp is configured to operate as a rear clearance lamp, left side turn signal, or right side stop/turn/tail lamp. In another example, a refrigeration unit in the trailer may periodically, or on demand, report its current temperature settings, such as, that the unit is currently set to hold 34 degrees Fahrenheit, or that it is set to report a warning condition, and that the threshold for reporting the warning condition is a temperature deviation of more than 5 degrees. In another example, the trailer components may include a door sensor that is configured to report the status of a door in the trailer every minute, every 5 minutes, or at some other suitable interval.

In another aspect, power may be supplied to any of the trailer components 115 through a power cable 160 that is electrically connected to a power source 155 in the truck 105. The power source may include the truck's electrical system including a battery, alternator, or other suitable power source. In another aspect, the trailer-related data values 125 may include values indicating the status of the power supplied by the power cable 160 to the trailer components 115.

Figure 2:
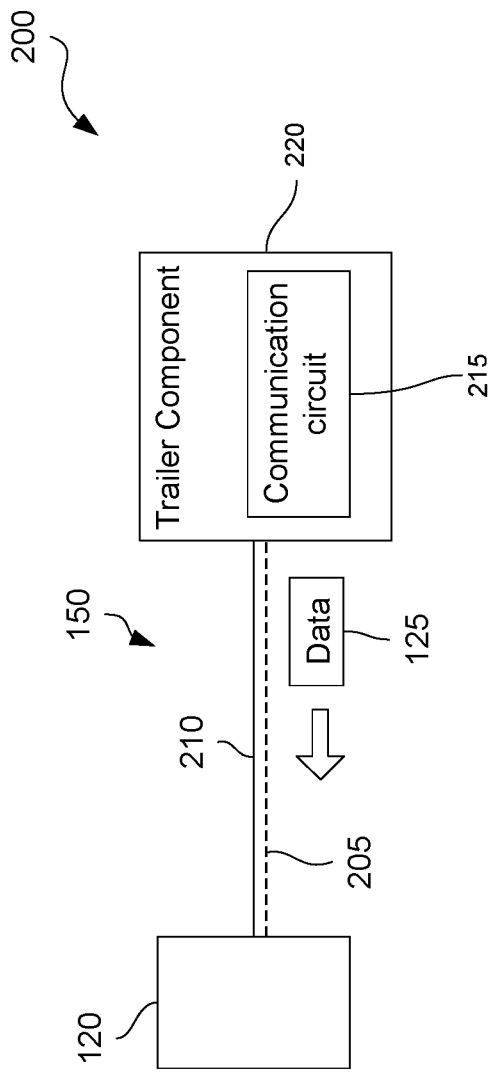
FIG. 2 is a component diagram illustrating one configuration of a trailer component that may be included in the truck trailer of FIG. 1.

As shown in FIG. 2 at 200, the trailer components disclosed herein may include a trailer component 220 that optionally includes a communication circuit 215. Trailer component 220 is optionally electrically connected to the modulation unit 120 by the communication link 150. The communication link 150 may include any suitable cable such as a wire 210, and optionally a second or other additional cable 205 electrically connecting the modulation unit 120 to trailer component 220 and communication circuit 215. In this example, the trailer components include circuits arranged and configured to communicate state or status information to modulation unit 120. In another aspect, the communication circuit is absent from any component connector the trailer component may be electrically or physically coupled to. In one example, the communication link 210 may include a Control Area Network (CAN) and may be implemented to pass data between the trailer component and the modulation unit as datagrams (optionally referred to as packets) traveling on one or more wires or via a wireless link to the modulation unit 120. In another example, the communication link 210 may include a Local Interconnect Network (LIN) and may be implemented to pass data between the trailer component and the modulation unit as datagrams or packets traveling on one or more wires or via a wireless link to the modulation unit 120. In another example, the communication link 210 may include a Power Line Communication (PLC) implemented to pass data between the trailer component via a wired link such as power cable 160 and the like. This wired link may also provide power to the trailer components, or to some portion thereof. The data may be passed over the power line using any suitable PLC technique.

Figure 3:
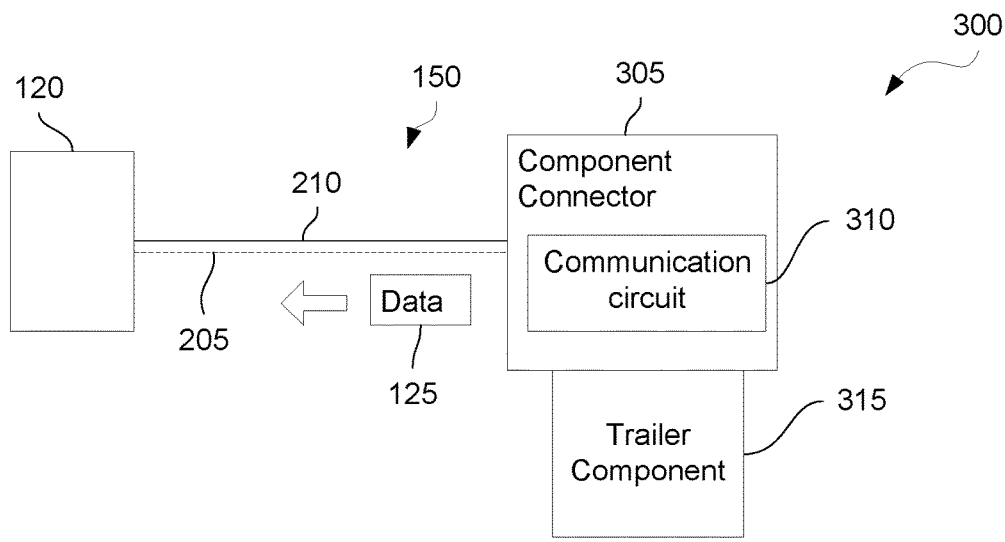
FIG. 3 is a component diagram illustrating another configuration for a trailer component that may be included in the truck trailer of FIG. 1.

In another example shown in FIG. 3 at 300, trailer components 115 may include a trailer component 315 that is coupled to a component connector 305 of trailer 110. Component connector 305 optionally includes a communication circuit 310 that may operate like communication circuit 215, or according to other examples disclosed herein. Trailer component 305 may be electrically connected to the modulation unit 120 by the communication link 150 as discussed above using one or more wires 205 and 210, and/or other communication methods such as by wireless communication, or by using a LIN or CAN. In this example, the trailer component connector 305 may include circuits arranged and configured to communicate state or status information to modulation unit 120. In another aspect, the communication circuit is absent from the trailer component that may be electrically or physically coupled to component connector 305.

Figure 4:
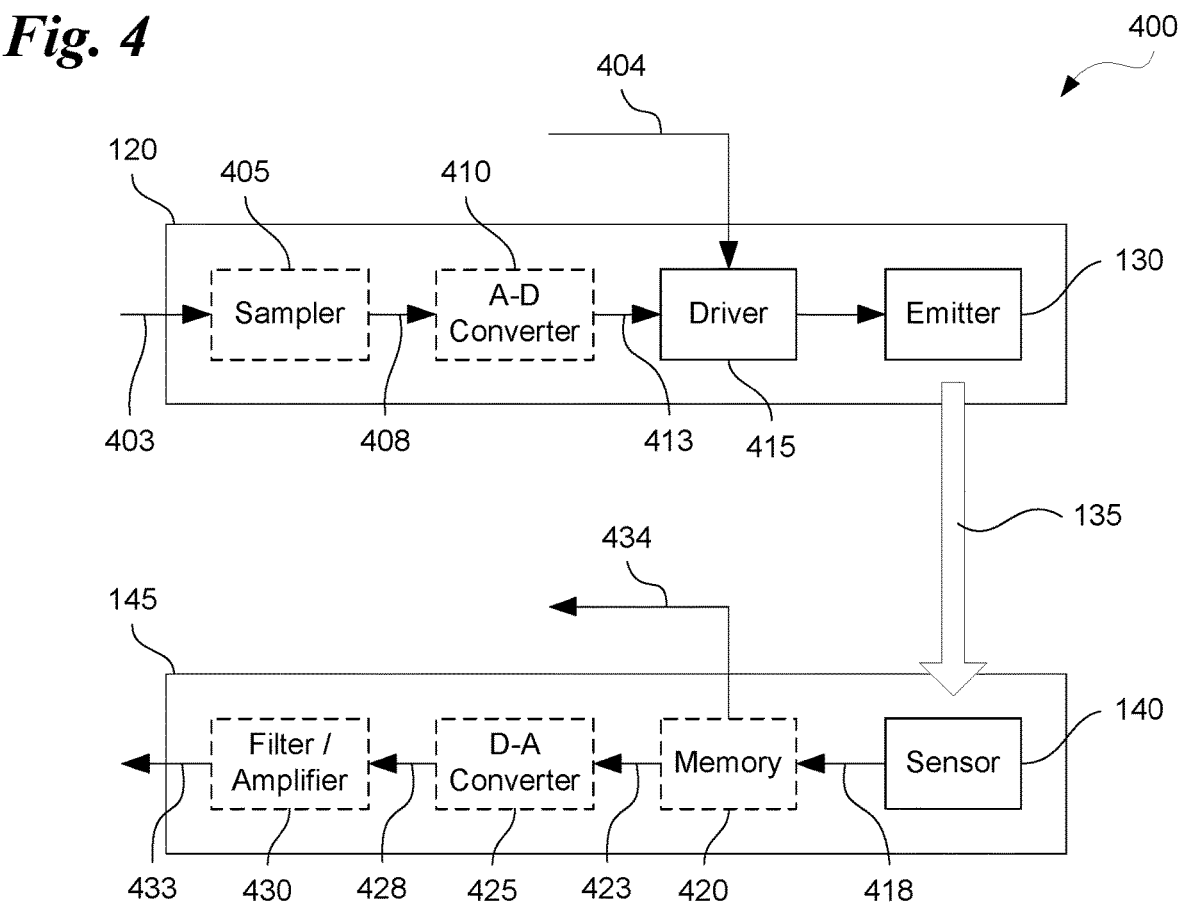
FIG. 4 is a component diagram illustrating aspects of modulation and demodulation that may be included in the communication system of FIG. 1.

Illustrated in FIG. 4 at 400 is one example of circuits that may be included in any of the disclosed modulation units such as 120, and/or in any of the disclosed demodulation units such as 145. The modulation and demodulation units disclosed herein may be configured to modulate and demodulate digital or analog signals, or any combination thereof. For example, modulation unit 120 optionally activates and deactivates, or otherwise changes the behavior of, aspects of front-facing light emitter 130 to affect changes in some aspect of the emitted light. For example, these changes may occur over time thus creating a time varying signal corresponding to the encoded trailer-related data values 125. In this way, the encoded data values may be transmitted from the emitter 130 to the sensor 140. For example, modulation unit 120 may accept an analog input signal 403 representing data to be sent from the trailer to the truck. In another aspect, modulation unit 120 may also, or in the alternative, accept digital input signal 404.

For analog input signal 403, demodulation unit 120 may include an optional sampler circuit 405 for sampling the incoming analog signal 403 and producing samples 408 as output. Samples 408 may be included as input into an optional analog to digital converter 410 configured to accept samples 408 and convert them to a digital signal 413. Digital signal 414, and/or digital input signal 404 may be accepted as input signals to a driver circuit 415 for activating and deactivating emitter 130 as needed to generate the corresponding forward-biased light 135. Driver 415 may be responsible for changing the at least one aspect of the forward-biased light 135 according to the encoded trailer-related data received from components in the trailer. The light 135 may be emitted by the emitter 130 and received or detected by sensor 140 of the demodulation unit 145.

Sensor 140 may be arranged and configured to responsive to light 135, such as, for example, by being positioned within line of sight of emitter 130. Upon detecting such the electromagnetic energy from the emitter, sensor 140 may pass a digital signal 418 from sensor 140 to an optional memory 420. The digital signal from sensor 140 may optionally be obtainable from the demodulation unit 145 as a digital output signal 434. This digital output signal may be presented to a digital to analog converter 425 via digital output signal 423. Digital to analog converter 425 may optionally be included with demodulation unit 145 in the case where an analog output signal 433 is included. The digital output signal 423 may be converted by the digital to analog converter 425 to one or more output signal samples 428. These output signal samples may optionally be filtered and/or amplified by a filter/amplifier 430 and the resulting analog output signal 433 may be the overall result of modulating the forward biased light 135 as an analog signal.

Figure 5:
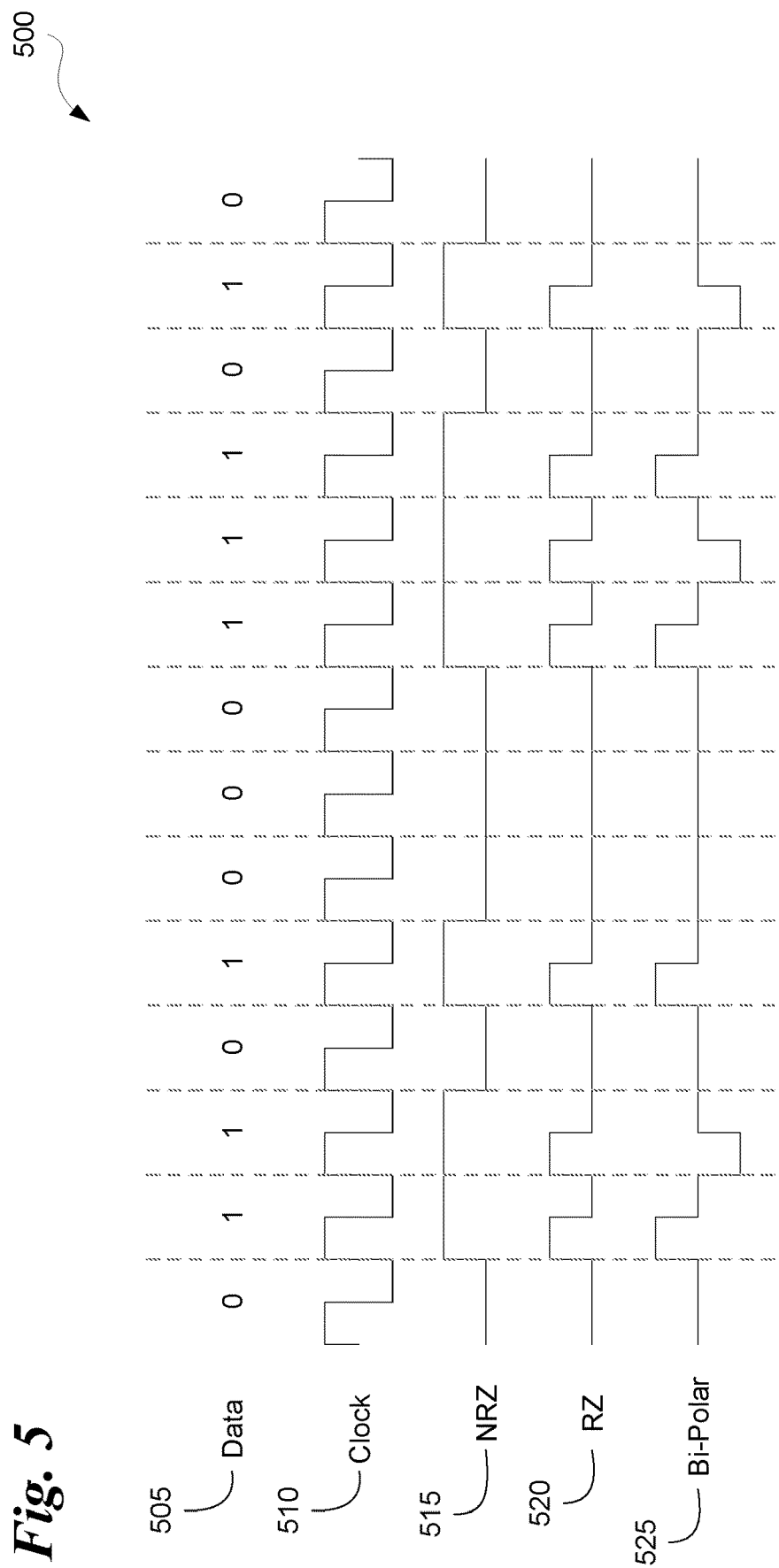
FIG. 5 is a timing diagram illustrating some examples of data modulation that may be found in the communication system of FIG. 1.

In another aspect, the disclosed communication system, may include any suitable light emitter such as emitter 130, or others as disclosed herein, that may be arranged and configured to emit pulses of light, or to otherwise change some aspect of the emitted light. The result includes a time varying sequence corresponding to the encoded trailer-related data values. This is illustrated by examples shown at 500 in FIG. 5. Data values 505 are illustrated as a collection of 0s and 1s representing data to be transmitted. Examples of such data are disclosed throughout and include encoded trailer-related data received from components in the trailer. In this example, the data is in digital format, however, as noted in FIG. 4, the original data may come to the modulation/demodulation process either in a digital format, or as an analog signal which is first converted to a digital format. Examples shown in FIG. 5 is merely illustrative of one way that a time varying sequence may be created that corresponds to the encoded data about the trailer components. Other techniques may be used, such as, an analog encoding process which may begin with the digital signal and convert to an analog for transmission, or begin as an analog signal and remain an analog signal, or be transformed to a different analog signal for transmission.

The data 505 may be a portion of a stream of data, or a collection of data representing a packet of information with headers, payload, and the like, such as in the case of packets received from a Control Area Network (CAN). These are illustrative examples rather than restrictive as any collection of data values may be considered for data 505. A clock signal 510 may be useful to coordinate the modulation and demodulation of the data, and this clock signal 510 may be initialized by the disclosed modulation and demodulation units in a preliminary "hand-shaking" sequence to ensure future communication is carried out in an organized manner. Such hand-shaking operation may, for example, occur when the modulation unit 120 and demodulation unit 145 are powered on. Some methods of encoding data operate with the benefit of clock signal 510, while others do not require a clock signal to properly synchronize communications. Thus clock signal 510 is presented in FIG. 5 as an optional aspect of the overall system.

Examples of different sequences of changes in some aspect of the emitted light are illustrated at 515, 520, and 525. These are merely examples and are not meant to be restrictive as any suitable sequence of changes to the light may be used for transmitting data 505 from emitter 130 to sensor 140. Examples include any suitable line code pattern including, but not limited to line codes such as Return to Zero (RZ) 520, Non-Return-to-Zero 515, and Bi-Polar 525 as shown. Other line codes that may be used include Manchester, Differential Manchester/biphase, Conditioned Diphase, 4B3T, Alternate mark inversion, Carrier-suppressed return-to-zero, and Alternate-phase return-to-zero, to name a few nonlimiting examples.

Figure 6:
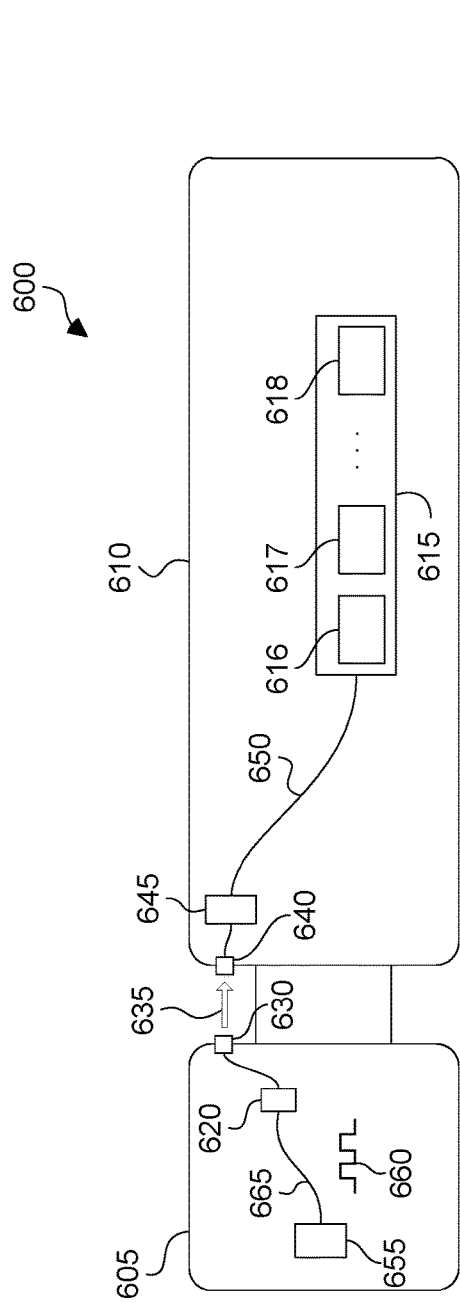
FIG. 6 is a component diagram illustrating another example of components that may be included in a wireless communication system like the one shown in FIG. 1.

FIG. 6 illustrates at 600 another example of a communication system for a truck trailer where the truck is configured to communicate commands to the trailer. The system may include a truck 605 coupled to a trailer 610. The trailer 610 may include one or more trailer components 615 which may comprise any suitable arrangement of trailer components such as trailer components 616, 617, and 618 which may be like the trailer components 115, or other trailer components disclosed herein elsewhere. The truck 605 may include a controller 655 electrically connected to a modulation unit 620. The controller 655 may be configured to send truck-related data values representing information about the truck and/or commands for the trailer components to a modulation unit 620. The modulation unit may be responsive to the truck controller and optionally configured to encode the truck-related formation to be sent to the trailer using modulation unit 620 and rear a facing light emitter 630.

Data values 660 may be arranged and configured as commands for specific individual trailer components 615, groups of trailer components 615, or any combination thereof. In another aspect, the data values may include vehicle operational aspects such as the speed of the truck 605, a change in speed of the truck, a level of braking applied, a gross vehicle weight of the truck and trailer, the weight of the load in the trailer, a location of the truck, a route of the truck, or any combination of these are other values. These and possibly other data values may be useful to components 615 such as in the case of an Anti-lock Braking System (ABS) controller component, or refrigeration unit controller to name a few examples.

The data values 660 may represent adjustments to operational aspects of trailer components 615 such as values or commands to a trailer component or group of components, deactivating a component or group of components, or changing the operating mode of one or more components to adjust their behavior (e.g. commanding a camera trailer component to change zoom length, white balance, or switch to "night mode"; commanding a refrigeration unit trailer component to increase or decrease temperature; commanding a lamp trailer component to flash slower or faster, or to flash with alternating colors, or to change the duty cycle of time off vs. time on for the lamp to change between different predetermined time varying sequences). Any aspect of the operation of a trailer component 615 may be changed via a command 660.

In another aspect, the communication system at 600 may include a rear-facing light emitter 630 responsive to the modulation unit 620 and arranged and configured to direct rear biased light 635 toward trailer 610. The rear biased light may include visible or invisible light directed away from the rear of the truck toward the front of the trailer to provide for communication to the trailer. As with other light emitters disclosed herein, the rear facing light emitter 630 may be configured to change at least one aspect of the rear biased light according to the command related data 660 received by modulation unit 620. As disclosed herein elsewhere, these include the frequency or color of the light, and/or the intensity or brightness of the light, or any combination thereof any. Modulating the rear biased light 635 may include varying the voltage, current, or power supplied to the light emitter 630. Any suitable modulation technique may be employed in the transmission of the data values 660 including those modulation techniques disclosed herein. In another aspect, the light emitted by emitter 630 may include colors or wavelengths of light visible to humans, and/or it may include ultraviolet or infrared light, or any combination thereof. In another aspect, the light emitter may include a single LED, or multiple LEDs, mounted to the rear of the truck which may be optionally arranged and configured to direct light toward the trailer.

In another aspect, the modulation unit 620 may be electrically connected to controller 655 via communication link 665. Such electrical connection may include a wired, wireless, or other suitable connection for carrying data or commands from controller 655 to modulation unit 620. The encoding and modulation of data values 660 may be performed in a manner similar to what is discussed herein elsewhere, such as with respect to data values 125, modulation unit 120, and front facing emitter 130.

In another aspect, the trailer 610 may include a front facing light sensor 640 that may be configured to face forward toward the truck. In another aspect, the front facing light sensor 640 may be responsive to changes of the at least one aspect of the rear biased light 635. In this way, front facing light sensor 640 may be configured and arranged to detect the presence of the rear biased light 635 sent by rear facing light emitter 630. A demodulation unit 645 may be included that is responsive to the front facing light sensor 640. The demodulation unit 645 may be arranged and configured to decode the data values 660. This decoding and demodulation may be performed as discussed herein elsewhere, such as with respect to demodulation unit 145 and rear facing sensor 140.

Figure 7:
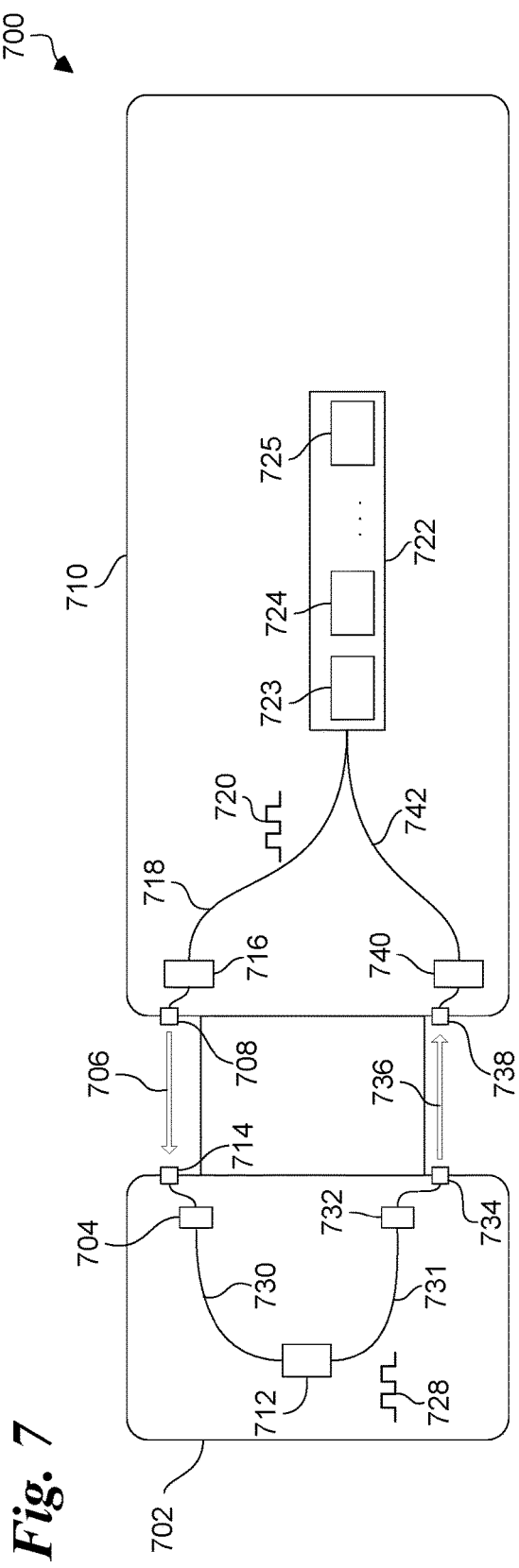
FIG. 7 is a component diagram illustrating yet another example of components that may be included in a wireless communication system like the one shown in FIG. 1.

FIG. 7 illustrates at 700 another example of a communication system for a truck and trailer where both the truck and trailer are configured to communicate with each other according to the principals of the present disclosure. In this example, data about the trailer and components thereof may be sent to the truck, and commands two one or more trailer components may be sent from the truck to the trailer to control the operation of the trailer.

The system may include a truck 702 coupled to a trailer 710. The trailer 710 may include one or more trailer components 722 which may comprise any suitable arrangement of trailer components such as trailer components 723, 724, and 725. These components may be like the trailer components 115 or 615 as disclosed herein elsewhere, or they may include other similar components of a truck trailer that may or may not be responsive to control from the truck. The trailer components 722 may be responsive to a modulation unit 716 configured to encode trailer related data values 720 representing operational aspects of the components 722 as disclosed herein elsewhere. In one aspect, the modulation unit 716 may be electrically connected to trailer components 722 via communication link 718. Such electrical connection may include a wired, wireless, or other suitable connection.

In another aspect, the communication system may include a light emitter 708 responsive to the modulation unit 716 and arranged and configured to direct light 706 toward truck 702 like emitters 130 and 630 and others disclosed herein. As mentioned with additional detail herein elsewhere. The forward biased light may include visible or invisible light directed away from the front of the trailer toward the truck. Emitter 708 may be configured to change at least one aspect of the forward biased light according to the encoded trailer data 720 received by modulation unit 716 which include frequency or color of the light, intensity or brightness of the light, or any combination thereof any. Modulating the light 706 may include varying the voltage, current, or power supplied to the light emitter 708 over time. Any suitable modulation technique may be employed in the transmission of the encoded trailer data 720. In another aspect, the light emitted may include colors or wavelengths of light visible to humans, and/or it may include ultraviolet or infrared light, or any combination thereof. In another aspect, the light emitter may include a single LED, or multiple LEDs, mounted to the front of the trailer which may be optionally arranged and configured to direct light toward the truck.

In another aspect, the truck 702 may include a rear facing light sensor 714 that may be configured to face toward the trailer 710. In another aspect, the rear facing light sensor 714 may be responsive to changes of the at least one aspect of the forward biased light emitter 708. In this way, rear facing light sensor 714 may be configured and arranged to detect the presence of the light 706 sent by front facing light emitter 708. A demodulation unit 704 may be included in truck 702 that is responsive to the rear facing light sensor 714. The demodulation unit may be arranged and configured to decode the trailer related data values 720 representing operational aspects of the trailer components 722. In another aspect, the truck 702 optionally includes a controller 712 whose functional aspects may include orchestrating full-duplex incoming and outgoing communication between the truck and trailer. For example, controller 712 may be electrically connected to a demodulation unit 704 and configured to receive and process data values 720 from the trailer components. This communication between the controller and the demodulation unit may be provided by a communication link 730 which may include a wired or wireless electrical connection for delivering data values received by sensor 714 as modulated light to controller 712. In one example, the control functions provided by controller 712 may be included with a vehicle controller of truck 702. In another example, controller 712 is a separate and distinct unit in a separate housing from other control circuits in truck 702. In this case, controller 712 may be configured to communicate with and operate in conjunction with a vehicle controller of truck 702.

In another aspect, the trailer-related data values representing operational aspects may include any suitable operational characteristics of trailer components 720 like those discussed herein elsewhere. In one example, the trailer-related data values include values indicating the operational status of a trailer component, values indicating temperature, pressure, humidity, weight, movement, or other environmental aspects detected by the at least one trailer component, and/or data indicating that one or more of the trailer components 115 is/are malfunctioning.

Controller 712 may be electrically connected to a modulation unit 732 configured to modulate the commands, data, or other communications that are to be sent to the trailer 710 from the truck 702. This communication between the controller and the modulation unit may be provided by a communication link 731 such as via a wired or wireless electrical connection. The controller 712 may be configured to send data values 728 for trailer components 722. These data values may be like those disclosed herein elsewhere and/or may be configured to represent commands or operational aspects specific to individual trailer components 722, groups of trailer components 722, or any combination thereof. Data values 728 may represent adjustments to operational aspects of trailer components, examples of which include those disclosed herein elsewhere (e.g. with respect to data values 660). Such commands may include activating or deactivating a component or group of components, changing operating modes, or otherwise making changes to the behavior of components 722. Any aspect of the operation of a trailer component 722 may be changed via a commands 728.

In another aspect, the communication system at 700 may further include a rear-facing light emitter 734 responsive to the modulation unit 732 and arranged and configured to direct light 736 toward trailer 710. Emitter 734 may be configured like other light emitters disclosed herein elsewhere and may include single or multiple lamps, LEDs, or other such devices for emitting light. As disclosed herein, rear biased light may include visible or invisible light directed away from the rear of the truck toward the front of the trailer to provide for communication to the trailer 710. As with other light emitters disclosed herein, the rear facing light emitter 736 may be configured to change at least one aspect of the light 736 according to the commands or data 728 received by modulation unit 732 from controller 712.

Like other emitters disclosed herein elsewhere, aspects of the light 736 that may be changed by the light emitter 734 may include, frequency, intensity, or other aspects of the light which may, or may not be, visible to the human eye. Modulating the light 736 may also include varying the voltage, current, or power supplied to the light emitter 734. Any suitable modulation technique may be employed in the transmission of the commands or data 728.

In another aspect, the trailer 710 may also include a front facing light sensor 738 that may be configured to face forward toward the truck. In another aspect, the front facing light sensor 738 may be like other such front facing light sensors disclosed herein and respond to changes of the at least one aspect of the rear biased light 734. In this way, front facing light sensor 738 may be configured and arranged to detect the presence of the light 736 sent by rear facing light emitter 734. A demodulation unit 740 like those disclosed herein may be included that is responsive to the front facing light sensor 740. The demodulation unit 645 may be arranged and configured to decode the commands or data 728 sent from truck 702 to trailer components 722. This decoding and demodulation may be performed as discussed herein elsewhere, such as with respect to demodulation unit 145 and rear facing sensor 140, and others.

Figure 8:
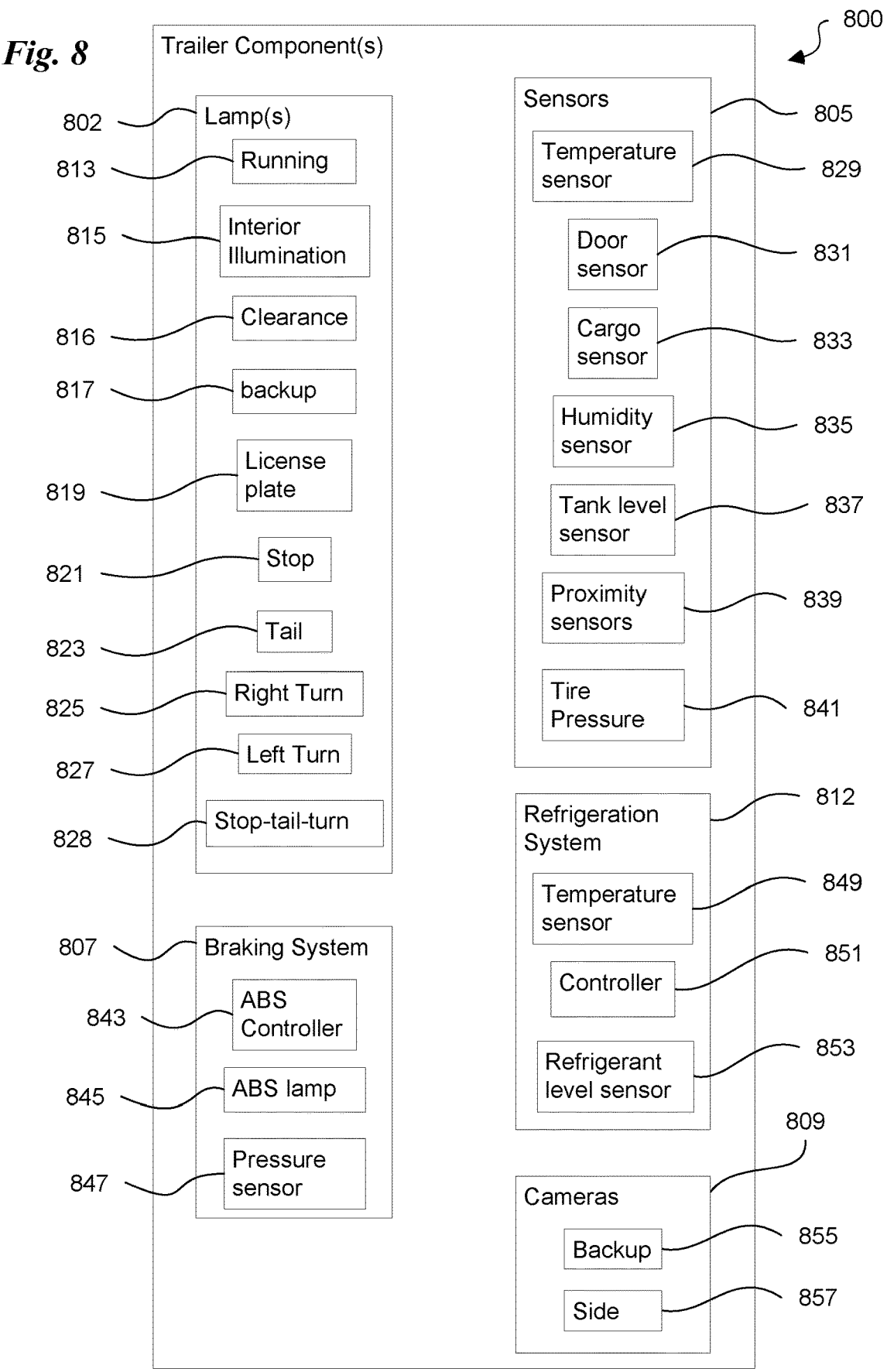
FIG. 8 is a component diagram illustrating components that may be included in the trailer shown in any of the preceding figures.

Examples of trailer components that may be electrically connected to cable systems like those discussed herein elsewhere are shown in FIG. 8 at 800. The trailer components discussed herein include, but are not limited to, what is shown in FIG. 8. Other components mounted to a trailer may be included while some listed here may be excluded depending on the trailer.

The trailer components 800 may include lamp(s) 802, braking system 807, sensors 805, cameras 809, and/or refrigeration system 812. For example, lamp(s) 802 may include, but are not limited to, running lamps 813, interior illumination lamps 815 for lighting the interior of the trailer, side marking/clearance/identification lamps 816 for marking extremities of the trailer, backup lamps 817 for illuminating the area behind the trailer, license plates 819 for lighting the license plate area on the trailer, stop lamps 821 that may illuminate when the vehicle is actively braking, tail lamps 823, left turn lamps 827 and right turn lamps 825, and/or, stop-tail-turn lamps 828.

The sensors 805 may include any of temperature sensor 829 for sensing the temperature in and/or around the disclosed trailers, door sensor 831 configured to optionally sense when trailer doors are open or closed, cargo sensor 833 configured to optionally sense weight, location, and/or other attributes of cargo in or on the trailer, humidity sensor 835 for optionally sensing absolute or relative humidity in and/or around trailer 103, tank level sensor 837 optionally for sensing the level of fluids (liquids or gases) carried by the trailer, proximity sensor 839 optionally for sensing proximity of the trailer relative to nearby objects, and/or tire pressure 841 optionally for sensing pressure levels in tires of the trailer.

The braking system 807 may optionally include an anti-lock Brakes (ABS) controller 843 for controlling the ABS braking system, ABS lamp 845 optionally for indicating the status or failure of the braking system 807, and/or pressure sensor 847 optionally included to sense changes in hydraulic or air pressure in braking system 807. Other optional trailer components include cameras 809 such as one or more backup cameras 855 for optionally capturing a view of the surrounding area directly behind the trailer, and one or more side cameras 857 for optionally capturing a view of areas adjacent to the sides of the trailer.

Components of refrigeration system 812 may include temperature sensor 849 for determining the temperature inside the refrigerated cargo area of the trailer, controller 851 configured to control the refrigeration cycle in the refrigeration system, and refrigerant level 853 for determining the level of refrigerant in refrigeration system 812.

In another aspect, any of the disclosed emitters such as emitter 130, 630, or 708, or 734 may be included in, or mounted adjacent to, a trailer component. Similarly, any of the disclosed sensors such as sensor 140, 640, 714, or 738 may optionally be included with or mounted adjacent to, a trailer component. For example, any of the disclosed sensors and emitters may optionally be mounted in a lamp such as a clearance lamp, side marker lamp, tail lamp, and the like. In another example, one LED of an LED lamp having multiple LEDs may be operated as an emitter separate from the remaining portion of the LEDs in the lamp. In another aspect, the lamp (including all of the LEDs or other such light sources in the lamp), may operate as an emitter as disclosed herein. In another aspect, a single trailer component may include both an emitter and a sensor, and the emitter and sensor portions may optionally be operated separately at different times so that the trailer components such as a backup camera, lamp, and the like may operate as an emitter in some circumstances, and/or as a sensor in others.

As illustrated in FIGS. 8 and 9, the trailer components disclosed here may include a vehicle lamp, one example of which is shown at 900. Lamp 900 optionally includes multiple LEDs 905-940. In one aspect, one or more of the LEDs 905-940 may have failed. For example, in FIG. 9, LEDs 930, 935, and 940 represent a portion of the LEDs in lamp 900 which have failed. The trailer-related data sent from the disclosed trailers may thus include data values indicating information about the LEDs that have failed, such as the number of LEDs, the location in the trailer of the lamp that is reporting the failures, identifying information about the specific LEDs in the lamp that failed, and the like. In another aspect, lamp 900 may be mounted and configured to operate as a running lamp, interior illumination lamp, clearance lamp, backup lamp, stop/tail/turn lamp, or any other lamp that may be included in trailer components mounted to the trailers disclosed herein.

FIGS. 10-15 illustrate three different examples of locations on different types of truck trailers where light sensors and/or emitters of the present disclosure may be located. Some of illustrated locations correspond with requirements for the location of various lighting devices or other trailer components on semi-trailers such as those required by the Federal Motor Vehicle Safety Standards (FMVSS) for lamps and reflective devices found in 49 CFR 393.11. In another aspect, the disclosed locations for emitters and sensors on a trailer may include additional locations besides what is offered in the requirements of the FMVSS for lighting. For example, some trailer components and/or the disclosed sensors and emitters may be located in any suitable location of a trailer including locations on sides or regions not visible in the drawing, or in other locations not specifically mentioned herein. Thus FIGS. 10-15 are therefore illustrative and not restrictive as any suitable location is envisioned.

In one example, FIGS. 10 and 11 illustrate a dry van or box type semi-trailer 1000. The emitters and sensors discussed herein such as emitter 130 or 708, or sensor 738, or others, may be mounted in any suitable location, such as along the top front and sides of a box trailer. For example, they may be mounted adjacent to or as part of front clearance lamps 1002, upper front side marker lamps 1004, and upper intermediate side marker lamps 1006. Other locations the emitters and sensors may be mounted include along the upper front portion 1003, lower front portion 1007, or anywhere on the front 1005 of the trailer. The disclosed sensors or emitters may optionally be mounted along the lower front side marker lamps 1008, side marking 1010, intermediate side reflex reflectors 1012, lower intermediate side marker lamps 1014, side marking 1016, side rear marker lamps and reflex reflectors 1018, or at an upper rear portion of the trailer 1019. FIG. 11 illustrates some other possible locations the emitters or sensors may be located, such as adjacent, or as part of, one or more left rear clearance lamps 1022, rear identification lamps 1024, right rear clearance lamps 1026, or at rear upper body markings 1028 and 1030 which may be arranged along the top portion of the rear of the trailer, or optionally on a rear door of the trailer. The disclosed sensors and emitters may also be located closer to the bottom of the trailer adjacent to, or as part of, rear stop, turn, or tail lamps and reflex reflectors at 1034 and/or 1036, rear lower body marking 1032, license plate lamp(s) 1038 and/or bumper bar marking 1040.

FIGS. 12 and 13 illustrate a bulk liquid or tanker semi-trailer 1200. The emitters and sensors discussed herein such as emitter 130 or 708, or sensor 738, or others, may be mounted in any suitable location on trailer 1200, such as part of, or adjacent to, upper front side marker lamps 1004 and upper intermediate side marker lamps 1006 mounted along the sides of the trailer about midway up the side of the bulk liquid container portion. Other locations the emitters and sensors may be mounted include along the upper front portion 1003, lower front portion 1007, or anywhere on the front 1005 of the trailer. The disclosed sensors and/or emitters may optionally be mounted adjacent to, or as part of, the front clearance lamps 1002, lower front side marker lamps 1008, side marking 1010, intermediate side reflex reflectors 1012 and side marking 1016 mounted along the lower sides, side rear marker lamps and reflex reflectors 1018 mounted on the sides at the rear, or on a top rear portion 1019 of the trailer. FIG. 13 illustrates some other possible locations the emitters or sensors may be located, such as adjacent, or as part of, one or more left rear clearance lamps 1022, rear identification lamps 1024, right rear clearance lamps 1026, or at rear upper body markings 1028 and 1030 which may be arranged along the top portion of the rear of the trailer. The disclosed sensors and emitters may also be located closer to the bottom of the trailer adjacent to, or as part of, rear stop, turn, or tail lamps and reflex reflectors at 1034 and/or 1036, rear lower body marking 1032, license plate lamp(s) 1038, lower body marking 1032, and/or bumper bar marking 1040.

FIGS. 14 and 15 illustrate a gooseneck flatbed semi-trailer 1400. The emitters and sensors discussed herein such as emitter 130 or 708, or sensor 738, or others, may be mounted in any suitable location on trailer 1400, such along the upper front portion 1003, lower front portion 1007, or anywhere on the front 1005 of the trailer. The disclosed sensors and/or emitters may optionally be mounted adjacent to, or as part of, the front clearance lamps 1002, lower front side marker lamps 1008, side marking 1010 and 1016 mounted along the lower sides, side rear marker lamps and reflex reflectors 1018 mounted on the sides at the rear, or on a top rear portion 1019 of the trailer. FIG. 15 illustrates some other possible locations the emitters or sensors may be located, such as adjacent, or as part of, one or more left rear clearance lamps 1022, rear identification lamps 1024, right rear clearance lamps 1026, or at rear upper body markings 1028 and 1030 which may be arranged along the top portion of the rear of the trailer. The disclosed sensors and emitters may also be located closer to the bottom of the trailer adjacent to, or as part of, rear stop, turn, or tail lamps and reflex reflectors at 1034 and/or 1036, rear lower body marking 1032, license plate lamp(s) 1038, lower body marking 1032, and/or bumper bar marking 1040.

FIG. 16 illustrates at 1600 another example of the disclosed communication system where a truck 1602 coupled to a trailer 1610 is positioned in front of a second truck 1615 coupled to a trailer 1618. In one aspect, truck 1602 and 1615 may be traveling together in a convoy. In another aspect, truck 1602 and 1615 may not be traveling in a convoy and may not be otherwise associated, but may both include aspects of the disclosed communication system which allow them to communicate directly with one another.

The trailer 1610 may include one or more trailer components 1644 which may comprise any suitable arrangement of trailer components such as trailer components like the trailer components 115, 800, or others, disclosed herein elsewhere. The trailer components 1644 may be electrically connected via a communication link to a modulation unit 1608. Modulation unit 1608 may be configured like other modulation units disclosed herein to encode trailer related data values representing operational aspects of the trailer components 1644.

In another aspect, the communication system may include a front facing light emitter 1605 responsive to the modulation unit 1608 and arranged and configured to direct forward light 1603 in the direction of truck 1602. As disclosed herein elsewhere, the light may include visible or invisible light directed away from the front of the trailer toward the truck, and the front facing light emitter may be configured to change at least one aspect of the light according to the encoded trailer data received by modulation unit 1608.

In another aspect, the communication system at 1600 may include a second rear facing light emitter 1620 configured to direct away from the rear of the trailer 1610. The Rear-facing light emitter 1620 may optionally be responsive to the modulation unit 1608. In another aspect, rear facing light emitter 1620 may be coupled to a communication link that associates together the front facing light emitter 1605 and rear facing light emitter 1620 such that both light emitters emit light according to the encoded trailer data received by modulation unit 1608. In this example, trailer 1610 may communicate outward facing light emissions from multiple sides of the trailer in multiple directions such as to the front and/or to the back. These emissions may occur at about the same time, or may be unrelated to one another.

In another example, an additional optional modulation unit 1613 may be included and may optionally be electrically connected to trailer components 1644. In this configuration, trailer 1610 may include multiple modulation units corresponding to different emitters positioned at different locations around the trailer. With multiple modulation units, light emitters 1605 and 1620 may be configured to respond to different encodings signals and thus may not be operated in unison, or maybe operated in unison to send a different signal. In one aspect, modulation unit 1608 may be configured to accept some of the trailer data from component 1644 which may be a subset of all the available trailer data. In this example, forward facing light emitter 1605 may be configured to transmit a portion of the information about trailer components 1644 that is of particular interest to truck 1602 that is coupled to trailer 1610. In another aspect, modulation unit 1613 may be configured to modulate a different subset of the available trailer data than what is modulated by unit 1608. Thus rear facing light emitter 1620 may be configured to transmit different portion of the information about trailer components 1644 than what is transmitted by forward facing light emitter 1605.

In another aspect, in the situation where light emitters 1605 and 1620 are coupled to separate modulation units, the separate light emitters may be configured to encode data differently. For example, forward facing light emitter 1605 may encode data by adjusting the color of light emitted in a forward direction, while rear facing light emitter 1620 may encode data by activating and deactivating the emitter to transmit data in a rearward direction. Light emitters 1605 and 1620 may encode data in the same way, or in a different way, and thus any suitable combination of encoding techniques may be used in concert by both forward and rearward facing light emitter 1605 and 1624.

The second truck 1615, here shown following behind the trailer 1610 may include a front facing light sensor 1634 mounted on the second truck 1615 facing forward of the truck and toward the rear of the trailer 1610. Light sensor 1634 may thus operate in a fashion similar to other such light sensors disclosed herein and may be responsive to changes of at least one aspect of the rear-biased light 1624 emitted by light emitter 1620. In another aspect, the front-facing light sensor 1634 may be mounted in any suitable location of the second truck 1615. Such locations include, adjacent to or in a lamp of the second truck, on an upper portion of the front of the truck 1615 such as in a clearance lamp, and a lower portion of the truck 1615 such as adjacent to or behind a bumper, grill, windshield, or other portion. Any suitable location where sensor 1634 may detect light emitted by trailer 1610 is envisioned.

In another example illustrated in FIG. 17, a trailer 1700 includes a modulation unit 1705 that is like those illustrated and described herein elsewhere. Electrically connected to a light emitter 1710 also configured according to any of the examples disclosed herein. As disclosed herein elsewhere, modulation unit 1705 may receive trailer data such as information about the operational status or other aspects of trailer components like those discussed throughout. In this example, light emitter 1710 is optionally mounted inside trailer 1700 and may operate as an internal light emitter responsive to the modulation unit 1705. Light emitter 1710 is optionally arranged and configured to direct internal light 1715 into an interior 1730 of the trailer 1700. As discussed herein elsewhere with respect to the disclosed light emitters, the light emitter 1710 is optionally configured to change at least one aspect of the internal light 1715 according to the encoded trailer-related data values received from the modulation unit 1705. In another aspect, the internal light emitter 1710 may include an LED mounted inside the trailer adjacent to or as part of an interior trailer lamp assembly. Such an interior trailer lamp assembly may include trailer dome lights or other interior illumination lamps or light strips.

In another aspect, an internal light sensor 1720 may be positioned inside the trailer 1700 and responsive to changes of the at least one aspect of the internal light 1715 as discussed herein elsewhere. A demodulation unit 1725 responsive to the internal light sensor 1720 may operate like the demodulation units discussed herein elsewhere to accept input from sensor 1720 and from it produce data output. In this way, the demodulation unit 1725 may be configured to decode the trailer-related data values representing the operational aspects of the one or more trailer components as disclosed herein. Sensor 1720 and demodulation unit 1725 may be mounted in any suitable location within trailer 1700. In another aspect, multiple sensors and demodulation units may be included in trailer 1700. In this way, one or more sensors and demodulation units may be positioned inside the trailer to receive information from the trailer and respond accordingly.

In another example illustrated at 1800 in FIG. 8, trailer 1700 may include modulation unit 1705 and emitter 1710 emitting light 1715 according to signals encoded by the modulation unit. In this example, personal computing device 1810 includes an internal light sensor 1805 and demodulation software 1815 that configures the personal computing device 1805 as discussed herein to accept as input the light sensed by sensor 1805 and to decode from it trailer data as disclosed herein. In this example, personal computing device may be used to obtain data from the trailer while the device is inside the trailer thus allowing for maintenance and repair, load monitoring, and other relevant activities to be formed. In another aspect, personal computing device 1810 may include or be implemented as a tablet computer, smart phone, laptop computer, or other personal computing device that includes a camera. Internal light sensor 1805 may thus include or be implemented as, a camera mounted in, included with, or coupled to, personal computing device 1810. Software 1815 may be configured to receive image data from the camera and from it obtain time the modulated light output. This image data may then be used as input into software 1815, such as in a time varying continuous stream of visual image data that may be used to decode the modulated light 1715 and from this decoded information obtain the transmitted trailer data as described herein elsewhere.

Figure 19:
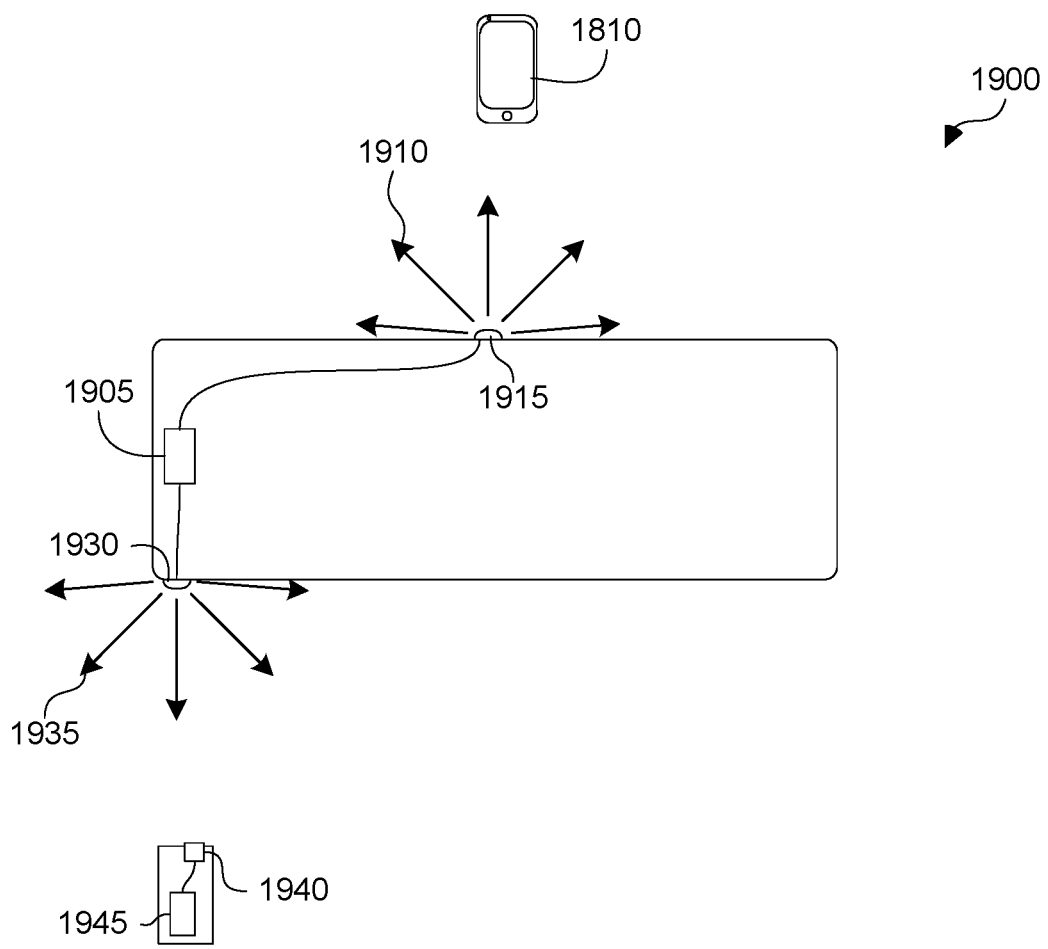

In another aspect illustrated in FIG. 19 at 1900, multiple light emitters 1915, 1920, and 1930, may be positioned inside, or outside on the sides of the trailer the separate light emitters may be coupled to a single modulation unit 1905, or as illustrated herein elsewhere, independently coupled with separate modulation units thus allowing emitted light 1910, 1925, 1935 to be modulated the same, or differently. In another aspect, modulation unit 1905 may be configured to modulate light differently for the separate emitters 1915, 1925, and 1935. For example, emitter 1915 may modulate light according to color, or emitter 1925 may modulate light by activating and deactivating emitter 1925, and emitter 1930 may modulate light according to changes in the intensity of the light. Each of these different modulation activities may be controlled by a single modulation unit 1905, or optionally by separate modulation units as disclosed herein elsewhere.

Similarly, modulation unit 1905 may be coupled to forward and rear facing light emitters as disclosed herein elsewhere, or to side facing emitters like emitters 1915 and 1935 located at different places around the trailer. The interior and side facing emitters may be advantageous for providing modulated light to a portable light sensor and demodulation unit such as optionally a personal computing device 1810 that may be carried around the trailer, inside the trailer, under the trailer, and the like. This may provide easy access to trailer related data for maintenance and/or load monitoring, or for other useful activities relative to trailer 1900. In another aspect, side facing light emitters 1915 and 1930 may interact with a stationary sensor 1940 electrically connected to, and in communication with a demodulation unit 1945. Emitter 1940 and demodulation unit 1945 may be mounted together in a stationary location such as in a facility, maintenance bay, a post near the entrance to a parking area, a wall inside or outside a building, or other stationary location adjacent to trailer 1900. In this example, sensor 1940 may detect modulated light emitted by emitters 1930, or 1910 as trailer 1900 passes by. Such a configuration may be useful in a loading or unloading facility, warehouse, vehicle waystation, and the like. Such transmissions may be received and demodulated by demodulation unit 1945 thus providing information about trailer components in trailer 1900 as disclosed herein, such as status information, component failure information, and the like. FIG. 19 illustrates one example of how the disclosed system may be mounted adjacent to or as part of a clearance lamp, turn signal lamp, reflector, camera, refrigeration unit, or any other disclosed trailer component, and they may be positioned in any suitable location on a trailer so that stationary or mobile systems or devices may be used to obtain information about trailer components.

Other examples of the disclosed concepts include the following numbered examples:

Example 1

A communication system for a truck and trailer, comprising:
  at least one trailer component mounted to the trailer;
  a modulation unit responsive to the at least one trailer component, a light emitter responsive to the modulation unit arranged and configured to direct light away from the trailer toward the truck;
  a light sensor responsive to changes of the at least one aspect of the light; and
  a demodulation unit responsive to the light sensor.

Example 2

The communication system of any preceding example, wherein the modulation unit is configured to encode trailer-related data values representing operational aspects of the at least one trailer component sent to the modulation unit.

Example 3

The communication system of any preceding example, wherein the light emitter is configured to change at least one aspect of the light according to the encoded trailer-related data values received from the modulation unit.

Example 4

The communication system of any preceding example, wherein the demodulation unit is configured to decode the trailer-related data values representing the operational aspects of the at least one trailer component Example 5

The communication system of any preceding example, wherein the light sensor is mounted to the truck.

Example 6

The communication system of any preceding example, wherein the light sensor is configured and arranged to face toward the light emitter.

Example 7

The communication system of any preceding example, wherein the light emitter is configured and arranged and configured to face toward the light sensor.

Example 8

The communication system of any preceding example, wherein the light sensor is mounted in a stationary location separate from the truck and trailer.

Example 9

The communication system of any preceding example, wherein the light emitter is mounted in a stationary location separate from the truck and trailer.

Example 10

The communication system of any preceding example, wherein the trailer-related data values include values indicating that the at least one trailer component is malfunctioning.

Example 11

The communication system of any preceding example, wherein the at least one trailer component is a vehicle tail lamp having multiple LEDs.

Example 12

The communication system of any preceding example, wherein the trailer-related data values include values indicating that at least a portion of the multiple LEDs has failed.

Example 13

The communication system of any preceding example, wherein the at least one trailer component includes one or more of a vehicle stop-tail-turn lamp, vehicle clearance lamp, vehicle turn signal lamp, vehicle brake lamp, vehicle tail lamp, vehicle running lamp, vehicle anti-lock brake system, vehicle interior illumination lamp, vehicle reverse lamp, pressure sensor, temperature sensor, door sensor, cargo sensor, cargo length sensor, liquid level sensor, refrigeration sensor, or any combination thereof.

Example 14

The communication system of any preceding example, wherein the front-facing light emitter includes an LED mounted to the front of the trailer arranged and configured to direct light toward the truck.

Example 15

The communication system of any preceding example, wherein the LED is part of a vehicle clearance lamp assembly mounted to the front of the trailer.

Example 16

The communication system of any preceding example, wherein the LED is configured to emit light that is visible to humans.

Example 17

The communication system of any preceding example, wherein the LED is configured to emit ultraviolet or infrared light, or any combination thereof.

Example 18

The communication system of any preceding example, wherein the at least one aspect of the light emitted by the light emitter is a wavelength of the light.

Example 19

The communication system of any preceding example, wherein the at least one aspect of the light emitted by the light emitter is current supplied to the front-facing light emitter.

Example 20

The communication system of any preceding example, wherein the at least one aspect of the light emitted by the light emitter is the intensity of the forward-biased light.

Example 21

The communication system of any preceding example, wherein the trailer-related data values are generated by a communication circuit in the at least one trailer component.

Example 22

The communication system of any preceding example, wherein the at least one trailer component is electrically connected to the modulation unit by a wire.

Example 23

The communication system of any preceding example, wherein the trailer-related data values are generated by a communication circuit in a socket electrically connecting the at least one trailer component to the modulation unit.

Example 24

The communication system of any preceding example, wherein the trailer-related data values are generated by a communication circuit in a socket, and wherein the at least one trailer component is arranged and configured to be insertable into the socket.

Example 25

The communication system of any preceding example, wherein the light emitter is arranged and configured to emit pulses of light in a sequence corresponding to the encoded trailer-related data values.

Example 26

The communication system of any preceding example, further comprising:
  a truck controller configured to send command-related data values representing commands to the at least one trailer component.

Example 27

The communication system of any preceding example, further comprising:
  a second modulation unit responsive to a truck controller, wherein the second modulation unit is configured to encode command-related data values representing commands sent from the truck controller to be delivered to the at least one trailer component.

Example 28

The communication system of any preceding example, further comprising:
a second light emitter arranged and configured to direct light away from the truck, wherein the second light emitter is configured to change at least one aspect of the light according to the encoded command-related data values received from the second modulation unit Example 29

The communication system of any preceding example, wherein the light directed away from the truck is directed toward the trailer.

Example 30

The communication system of any preceding example, further comprising:
a second light sensor facing toward the rear of the truck and responsive to changes of the at least one aspect of the light from the second light emitter.

Example 31

The communication system of any preceding example, further comprising:
a second demodulation unit responsive to the second light sensor that is configured to decode the command-related data values representing the commands to the at least one trailer component.

Example 32

The communication system of any preceding example, wherein power is supplied to the at least one trailer component through a power cable electrically connecting the at least one trailer component to a power source that is optionally in the truck.

Example 33

The communication system of any preceding example, wherein the trailer-related data values include values indicating the status of the power supplied by a power cable to the at least one trailer component.

Example 34

The communication system of any preceding example, further comprising:
a third light emitter configured to direct light away from the trailer, wherein the rear-facing light emitter is responsive to the modulation unit.

Example 35

The communication system of Example 34, wherein the third light emitter is mounted at the rear of the trailer.

Example 36

The communication system of Example 34 or 35, wherein the third light emitter is directed to the rear away from the back of the trailer.

Example 37

The communication system of any preceding example, wherein a second truck following behind the trailer has a front facing light sensor mounted on the second truck facing forward of the truck and toward the rear of the trailer and is responsive to changes of at least one aspect of a light emitter of the trailer.

Example 38

The communication system of any preceding example, wherein the light sensor is mounted in a lamp of the truck or the trailer.

Example 39

The communication system of any preceding example, wherein the light emitter is mounted in a lamp of the truck or the trailer.

Example 40

The communication system of any preceding example, wherein the light emitter is included as part of an LED lamp of the truck or the trailer and is a portion of the LEDs of the LED lamp.

Example 41

The communication system of any preceding example, comprising:
a truck controller configured to send truck-related data values representing information about the truck to the modulation unit, wherein the modulation unit is responsive to the truck controller, wherein the modulation unit is configured to encode truck-related data values representing the information about the truck sent to the modulation unit.

Example 42

The communication system of any preceding example, wherein the light emitter is configured to change at least one aspect of the light according to encoded truck-related data values representing information about the truck.

Example 43

The communication system of example 42, wherein the information about the truck includes any one or more of a speed of the truck, a change in speed of the truck, a level of braking applied, a gross vehicle weight of the truck and trailer, a load weight of the load in the trailer, a location of the truck, a route of the truck, or any combination thereof.

Example 44

The communication system of any preceding example, further comprising:

an internal light emitter responsive to the modulation unit arranged and configured to direct internal light into an interior of the trailer, wherein the internal light emitter is configured to change at least one aspect of the internal light according to the encoded trailer-related data values received from the modulation unit Example 45

The communication system of example 44, further comprising:
an internal light sensor positioned inside the trailer and responsive to changes of the at least one aspect of the internal light.

Example 46

The communication system of any one of examples 44 or 45, comprising:
a demodulation unit responsive to the internal light sensor, wherein the demodulation unit is configured to decode the trailer-related data values representing the operational aspects of the at least one trailer component.

Example 47

The communication system of any one of examples 44-46, further comprising:
a personal computing device inside the trailer, wherein the personal computing device includes the internal light sensor and the demodulation unit.

The Example 48

The communication system of any preceding example, wherein the internal light emitter includes an LED mounted inside the trailer as part of an interior trailer lamp assembly.

Glossary of Definitions and Alternatives

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.9375 and 4.8125.

"Activate" generally is synonymous with "providing power to", or refers to "enabling a specific function" of a circuit or electronic device that already has power.

"And/or" is inclusive here, meaning "and" as well as "or". For example, "P and/or Q" encompasses, P, Q, and P with Q; and, such "P and/or Q" may include other elements as well.

"Antenna" or "Antenna System" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff" angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Anti-lock Braking System" generally refers to a vehicle safety system that allows the wheels on a motor vehicle (including trailers) to maintain tractive contact with the road surface according to driver inputs while braking, preventing the wheels from locking up (ceasing rotation) and avoiding uncontrolled skidding. ABS systems automatically apply the principles of threshold braking and cadence braking albeit a much faster rate and with better control than drivers can typically manage manually. ABS systems include wheel speed sensors to detect reduced wheel rotation indicative of impending wheel lock. An ABS controller is also included that can automatically actuate the braking system to reduce braking force on the affected wheel or wheels, and to quickly reapply braking force when the danger of wheel lock is reduced. This overall feedback loop may be executed multiple times a second resulting in rapid activation and deactivation of braking force or "pulsing" of the brakes.

Maximum braking force is obtained with approximately 10-20% slippage between the braked wheel's rotational speed and the road surface. Beyond this point, rolling grip diminishes rapidly and sliding friction provides a greater proportion of the force that slows the vehicle. Due to local heating and melting of the tires, the sliding friction can be very low. When braking at, or beyond, the peak braking force, steering input is largely ineffective since the grip of the tire is entirely consumed in braking the vehicle.

Threshold braking seeks to obtain peak friction by maintaining the maximum braking force possible without allowing wheels to slip excessively. Braking beyond the slipping point causes tires to slide and the frictional adhesion between the tire and driving surface is thus reduced. The aim of threshold braking is to keep the amount of tire slip at the optimal amount, the value that produces the maximum frictional, and thus braking force. When wheels are slipping significantly (kinetic friction), the amount of friction available for braking is typically substantially less than when the wheels are not slipping (static friction), thereby reducing the braking force. Peak friction occurs between the static and dynamic endpoints, and this is the point that threshold braking tries to maintain.

"Cadence" braking or "stutter" braking involves pumping the brake pedal and is used to allow a car to both steer and brake on a slippery surface. ABS systems generally provide this behavior automatically and at a much higher rate than most drivers can manually produce. It is used to effect an emergency stop where traction is limited to reduce the effect of skidding from road wheels locking up under braking. This can be a particular problem when different tires have different traction, such as on patchy ice for example. Cadence braking maximizes the time for the driver to steer around the obstacle ahead, as it allows the driver to steer while slowing.

ABS generally offers improved vehicle control and decreases stopping distances on dry and slippery surfaces; however, on loose gravel or snow-covered surfaces, ABS can significantly increase braking distance, although still improving vehicle steering control.

"Brake Lamp" generally refers to a lamp (usually red) attached to the rear of a vehicle that illuminates when the brakes are applied to serve as a warning to fellow drivers. As used herein, the term "brake lamp" includes stop lamps as that term is defined under the present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Biased light" generally refers to a light that is directed in one direction more than another. In one example, light is biased by a lens positioned in front of a lamp so as to focus the otherwise unbiased light emitted by the lamp. In another example, a reflector may be placed on one side of a lamp to bias light in a given direction away from the reflector. Another example of biased light is light emitted from a laser. In this example, a laser beam is generally highly spatially coherent and thus highly biased so as to be easily directed in one direction and significantly less so in other directions.

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used.

A cable may include a sheath or layer surrounding the cable with electrically non-conductive material to electrically insulate the cable from inadvertently electrically connecting with other conductive material adjacent the cable.

A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Cargo Sensor" generally refers to a sensors configured to determine whether a vehicle is loaded or unloaded, to what extent a vehicle is loaded, and optionally the position of different portions of the load inside the vehicle. Any suitable sensing technology may be used for this purpose. Examples include cargo sensors that use ultrasonic detection, optical image analysis of the cargo area, or laser time-of-flight measurements for detecting the presence of cargo within a cargo area.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Communication System" generally refers to an arrangement of cooperating devices or systems configured to communicate with each other. The communication system may use electric or non-electric sources such as graphic images, electromagnetic radiation, the human voice, digital or analog data, and the like, and may carry information provided by these sources as electric or nonelectric signals.

A communication system may include input transducers or sensors to capture input from the sources. Such sensors may include microphones, cameras, keyboards, motion sensors, light sensors, or other such transducers for capturing some aspect from one location or environment and converting or capturing it as input. A transmitter may be included to convert captured information from the input sources into electric signals and may include aspects such as noise filters, analog-to-digital converters, encoders, modulators, signal amplifiers, and the like to prepare the captured input for transmission. Transmission may be achieved by an antenna, or any suitable device for converting the input to electromagnetic energy in any suitable form.

A receiver may be included to accept signals from a transmitter via a receiving antenna, the receiver may be configured to capture and reconstruct the signal as it was before transmission. The receiver may include components such as noise filters, digital to analog converters, decoders, demodulators, signal amplifiers, and the like. An output transducer may be included that is coupled to the receiver in any suitable way and is configured to convert the signals from a receiver to a different form such as the original form the information was in before it was transmitted. Such output transducers may include speakers for audio output, monitors displaying visual output, motors or actuators for translating the transmitted signal into movement or motion, lights, or other devices responsive to a signal output by the receiver.

"Communications cable" generally refers to a cable configured to carry digital or analog signals.

"Communication Link" generally refers to a connection between two or more communicating entities and may or may not include a communications channel between the communicating entities. The communication between the communicating entities may occur by any suitable means. For example, the connection may be implemented as a physical link, an electrical link, an electromagnetic link, a logical link, or any other suitable linkage facilitating communication.

In the case of a physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Control Area Network (CAN)" or "CAN bus" generally refers to a communication system and network protocol that may be used for intercommunication between components or subsystems of a vehicle. A CAN (sometimes referred to colloquially as a "CAN bus") allows one or more microcontrollers or CAN enabled devices to communicate with each other in real time without a host computer. A CAN may physically connect all nodes together through a two wire bus. The wires may be a twisted pair cable with a 120 ohm characteristic impedance. These wires may be thought of as "high" and "low" connections.

CAN may be thought of as an example of a multi-master serial bus for connecting Electronic Control Units (ECUs) also referred to as "nodes". Two or more nodes are required on the CAN network to communicate. The complexity of the node can range from a simple I/O device such as a sensor, an active device such as a lamp, transmission, or brake actuator, or an embedded computer or ECU with a CAN interface. A node may also be a gateway allowing a standard computer to communicate over a network connection such as a Universal Serial Bus (USB) or Ethernet port allowing outside devices to be selectively added or removed from the CAN network.

A CAN bus does not require any addressing schemes, as the nodes of the network use unique identifiers that may be provided by programming the individual node before use, or reprogramming between uses. This provides the nodes with information regarding the priority and the urgency of transmitted message.

Each node may include a central processing unit, microprocessor, or host processor. The host processor may be configured to determine what the received messages mean and what messages to transmit in response. A node may be electrically connected to sensors, actuators, lamps, or other electronic devices that can be connected to the host processor. A node may also include a CAN controller, optionally integrated into the microcontroller. The can control may implement the sending and receiving protocols. When receiving, the CAN controller may store the received serial bits from the bus until an entire message is available, which can then be fetched by the host processor (for example, by the CAN controller triggering an interrupt). When sending, the host processor may send the transmit message(s) to the CAN controller, which transmits the bits serially onto the bus when the bus is free. A node may also include a transceiver. When receiving: the transceiver may convert the data stream from CAN bus levels to levels that the CAN controller uses. It may have protective circuitry to protect the CAN controller. When transmitting, the transceiver may convert the data stream from the CAN controller to CAN bus levels.

Each node may be configured to send and receive messages, but not simultaneously. A message or Frame consists primarily of the ID (identifier), which represents the priority of the message, and up to eight data bytes. A CRC, acknowledge slot (ACK) and other overhead are also part of the message. The improved CAN FD extends the length of the data section to up to 64 bytes per frame. The message is transmitted serially onto the bus using a non-return-to-zero (NRZ) format and may be received by all nodes.

CAN data transmission may use a lossless bitwise arbitration method of contention resolution. This arbitration method may require all nodes on the CAN network to be synchronized to sample every bit on the CAN network at the same time. Thus data may be transmitted without a clock signal in an asynchronous format.

The CAN specifications may use the terms "dominant" bits and "recessive" bits where dominant is a logical 0 (actively driven to a voltage by the transmitter) and recessive is a logical 1 (passively returned to a voltage by a resistor). The idle sate may be represented by the recessive level (logical 1). If one node transmits a dominant bit and another node transmits a recessive bit, then a collision results and the dominant bit "wins". This means there is no delay to the higher-priority message, and the node transmitting the lower priority message automatically attempts to retransmit, for example, six bit clocks after the end of the dominant message.

All nodes on the CAN network generally operate at the same nominal bit rate, but noise, phase shifts, oscillator tolerance and oscillator drift mean that the actual bit rate may not be the same as the nominal bit rate. Since a separate clock signal is not used, a means of synchronizing the nodes is used. Synchronization is helpful during arbitration since the nodes in arbitration may see both their transmitted data and the other nodes' transmitted data at the same time. Synchronization is also helpful to ensure that variations in oscillator timing between nodes do not cause errors.

Synchronization may start with a hard synchronization on the first recessive to dominant transition after a period of bus idle (the start bit). Resynchronization may occur on every recessive to dominant transition during the frame. The CAN controller may expect the transition to occur at a multiple of the nominal bit time. If the transition does not occur at the exact time the controller expects it, the controller adjusts the nominal bit time accordingly.

Examples of lower-layer (e.g. levels 1 and 2 of the ISO/OSI model), are commercially available from the International Standardization Organization (ISO) and include ISO 11898-1 through 11898-6, as well as ISO 16845-1 and 16845-2.

CAN standards may not include application layer protocols, such as flow control, device addressing, and transportation of data blocks larger than one message, as well as, application data. Other CAN standards are available that are optimized for specific fields of use. These include, but are not limited to:
 ARINC 812 or ARINC 825 (for the aviation industry)
 CANopen-EN 50325-4 (used for industrial automation)
 DeviceNet (used for industrial automation)

EnergyBus-CiA 454 (used for light electrical vehicles)
ISOBUS-ISO 11783 (agriculture)
ISO-TP-ISO 15765-2 (Transport protocol for automotive diagnostic)
SAE J1939 (In-vehicle network for buses and trucks)
MilCAN
NMEA 2000-IEC 61162-3 (marine industry)
Unified Diagnostic Services (UDS)-ISO 14229 (automotive diagnostics)
CANaerospace-Stock (for the aviation industry)
CAN Kingdom-Kvaser (embedded control system)
CCP/XCP (automotive ECU calibration)
GMLAN-General Motors (for General Motors)
RV-C-RVIA (used for recreational vehicles)
SafetyBUS p-Pilz (used for industrial automation)
UAVCAN (aerospace and robotics)

"Controller" generally refers to a mechanical or electronic device configured to control the behavior of another mechanical or electronic device. A controller may include a "control circuit" configured to provide signals or other electrical impulses that may be received and interpreted by the controlled device to indicate how it should behave.

"Current" generally refers to the rate of flow of electric charge past a point or region. An electric current is said to exist when there is a net flow of electric charge through a region. When an electric current flows in a suitably shaped conductor at radio frequencies, radio waves can be generated. These travel at about the speed of light and can cause electric currents in distant conductors. Electric currents cause Joule heating, and may be useful for creating magnetic fields.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Demodulation" generally refers to a process of separating the properties of two time-varying signals to create multiple separate resulting output signals that together comprise the original signal. Demodulation is useful in the process of conveying data, such as in the case of transmitting a digital bit stream or an analog (continuously varying) signal using electromagnetic energy. It may be thought of as the opposite process to modulation, and is typically performed according to modulation process that created the received signal. For example, if a signal is modulated using Phase Shift Keying, or Frequency Modulation, the demodulation must also be performed using a complimentary technique to obtain the desired result. As with modulation, demodulation may be performed using a suitable digital demodulation scheme, analog demodulation scheme, or any other suitable scheme preferably corresponding to the original modulation technique.

"Diode" generally refers to a two terminal electrical device which allows current to flow in one direction, but prevents current from flowing in the opposite direction. Examples include p-n silicon junction diodes, light emitting diodes, Schottky diodes, and Zener diodes, to name a few.

"Electrically connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Forward-Biased" generally refers to being biased in the front or forward direction.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Ground cable" generally refers to a cable electrically connecting to a circuit ground.

"Infrared light" generally refers to electromagnetic radiation at frequencies above those of microwaves and just below those of red visible light. Infrared frequencies range from about 300 gigahertz (GHz) up to about 400 terahertz (THz), and wavelengths ranging between 1 mm o about 400 nm. Infrared light is also classified as follows:

"Far infrared" (FIR): Generally designates a band of frequencies from about 300 GHz to about 20 THz with wavelengths ranging from about 1 mm to about 15 μm long.

"Long-wavelength infrared" (LWIR): Generally designates a band of frequencies from about 20 THz to about 37 THz with wavelengths ranging from about 15 μm to about 8 μm long.

"Mid infrared" (MIR): Generally designates a band of frequencies from about 37 THz to about 100 THz with wavelengths from about 8 μm to about 3 μm long.

"Short wavelength infrared" (SWIR): Generally designates a band of frequencies from about 100 THz to about 214 THz with wavelengths from about 3 μm to about 1.4 μm long "Near-infrared" (NIR): Generally designates a band of frequencies from about 214 THz to about 400 THz with wavelengths from about 1.4 μm to about 750 nm long.

"Intensity" or "Luminous Intensity" generally refers to a photometric value, expressing the capacity of a point light source to provide illumination in a given direction. It commonly serves to establish the distribution of the light given off by a lit surface depending on the direction. In mathematical terms, luminous intensity is defined as the quotient of the elementary luminous flux by the elementary solid angle in which it is propagated, and is expressed in candela (cd). It is also useful as a measure of the radiant power emitted by an object in a given direction, and is dependent on the wavelength of light being emitted.

"Interior illumination lamp" generally refers to a lamp located in the interior of a vehicle or trailer.

"J-560 Compliant cabling system" generally refers to a cable system with multiple individual wires forming separate circuits in a truck trailer conforming to the Society of Automotive Engineers (SAE) J-560 standard. The J-560 standard requires an 8 AWG chassis ground wire, typically colored white, a 10 AWG wire (typically red) that is dedicated to brake or stop lamps, and a 10 AWG wire (often blue) that is dedicated to provide continuous ABS primary power and, alternatively, power for auxiliary devices. Four 12 AWG wires are commonly included (such as the yellow, green, brown, and black) wires, with the yellow wire dedicated to the left turn signal and hazard lamps, the green wire dedicated to the right turn signal and hazard lamps, the brown wire dedicated for tail and license plates and clearance and/or side marker lamps, and the black wire dedicated for clearance, side marker, and identification lamps. Thus, the conventional J-560 compliant cable system has an aggregate cross-sectional area of about 32 mm$^2$ calculated as the aggregate of four metallic 12 AWG cables each with a cross-sectional area of 3.3 mm$^2$, two metallic 10 AWG cables each with a cross-sectional area of 5.3 mm$^2$, one metallic 8 AWG cables each with a cross-sectional area of 8.4 mm$^2$.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-halide, mercury-vapor, sulfur, neon, sodium-vapor, or others.

"Li-Fi" or "Light Fidelity" is one example of Optical Wireless Communication (OWC) and generally refers to a wireless communication technology which utilizes light to transmit data and position between devices. In one example, Li-Fi is a light communication system that is capable of transmitting data at high speeds over the visible light, ultraviolet, and infrared light spectrums.

With respect to visible light, Visible Light Communications (VLC) works by switching the current to the LEDs off and on at a very high speed, too quick to be noticed by the human eye, thus, it does not readily appear to flicker under human observation. Although Li-Fi LEDs generally must be activated to transmit data, they may be optionally dimmed to below human visibility while still emitting sufficient light to carry data.

Li-Fi may include the ability to roam between various Li-Fi cells, also known as handover, which may allow communications to seamlessly transition between different geographical areas where Li-Fi is active. Because light waves cannot penetrate walls, range is limited generally to line of site, or perhaps further by virtue of focusing or directing light to avoid obstacles. Direct line of sight is not always necessary for Li-Fi to transmit a signal. For example, light reflected off walls can achieve high data rates exceeding 70 Mbit/s.

Li-Fi has the advantage of being useful in electromagnetic sensitive areas such as in aircraft cabins, hospitals and nuclear power plants without causing electromagnetic interference. Li-Fi also provides reduced opportunity for hacking relative to Wi-Fi. Both Wi-Fi and Li-Fi transmit data over the electromagnetic spectrum, but whereas Wi-Fi utilizes radio waves, Li-Fi uses visible, ultraviolet, and infrared light. Li-Fi has almost no limitations on capacity due to reduced spectrum which is becoming an issue with radio frequencies in some areas of wireless communication. The visible light spectrum is 10,000 times larger than the entire radio frequency 15 spectrum.

Bg-Fi is one example of a Li-Fi system is communication between mobile devices and consumer items implementing IoT (Internet of Things) technology that include simple optical or color sensors, microcontrollers, and embedded software. Light from the mobile device display may communicate to the color sensor on the consumer product, which converts the light into digital information. Light emitting diodes enable the consumer product to communicate synchronously with the mobile device.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Light Sensor" or "photoelectric device" or "photo sensor" generally refers to a device that converts electromagnetic energy in the form of light (e.g. photons) into electricity or electrical signals (e.g. electrons). A light sensor may be responsive to electromagnetic energy in a range of frequencies from "Infra-red" to "Visible" up to and including the "Ultraviolet" light spectrum. Examples include, but are not limited to:

Photo-emissive Cells: Devices which release free electrons from a light sensitive material such as caesium when struck by a photon of sufficient energy. The amount of energy the photons have depends on the frequency of the light and the higher the frequency, the more energy the photons have converting light energy into electrical energy Photo-conductive Cells: Devices which vary their electrical resistance when subjected to light. Photoconductivity results from light hitting a semiconductor material which controls the current flow through it. Thus, more light increase the current for a given applied voltage. Examples include Cadmium Sulfide LDR photocells.

Photo-voltaic Cells: Often referred to colloquially as "solar cells," these are devices whose electrical characteristics, such as current, voltage, or resistance, vary when exposed to light. Light energy falls on a semiconductor material causing electrons to be excited out of their normal orbits where they may be captured by an electrode.

Photo-junction Devices: These photodevices are mainly true semiconductor devices such as the photodiode or phototransistor which use light to control the flow of electrons and holes across their PN-junction. Photojunction devices are commonly designed for detector application and light penetration with their spectral response tuned to the wavelength of incident light.

"Liquid Level Sensor" generally refers to a sensor configured to measure the depth of liquid in a container. Examples include an optical level switch that includes an LED and a phototransistor, a capacitance level sensor, an ultrasonic sensor, electromagnetic sensors using microwaves, RADAR, and the like, vibrational sensors, conductive sensors, or float switches.

"LED Lamp" generally refers to an electrical device that uses Light Emitting Diodes (LEDs) to produce light using electrical power. A lamp may include a single LED, or multiple LEDs.

"LED fault signal" generally refers to a signal that is used to indicate the failure of an LED. The LED fault signal can take the form of power to illuminate a fault LED, a data message (such as via a serial communication protocol or other), a mechanical indicator, or other. The LED fault signal can be used to communicate a failed LED to an onboard computer or display system such as may be found in the cabin of a vehicle or a trailer.

"Local Interconnect Network (LIN)" generally refers to a network protocol used for communication between components in vehicles, usually by means of serial communication. LIN may be used also over the vehicle's battery power-line with a special LIN over DC powerline (DC-LIN) transceiver. Features of the protocol include, but are not limited to a single master, up to 16 slaves, Slave Node Position Detection (SNPD) that allows node address assignment after power-up, single wire communications greater than 19.2 Kbits/s with a bus length of 40 meters or less, guaranteed latency times, variable length of data frame (2, 4 and 8 byte frames), multi-cast reception with time synchronization, without crystals or ceramic resonators, data checksum and error detection, detection of defective nodes, and an operating voltage of 12V.

A LIN may be implemented as a single-wire network such as an asynchronous serial network described on ISO 9141. A microcontroller may generate all needed LIN data by software and is connected to the LIN network via a LIN transceiver. The LIN Master may use one or more predefined scheduling tables to start sending and receiving to the LIN bus. These scheduling tables contain relative timing information, where the message sending is initiated. One LIN Frame consists of the two parts header and response. The header is always sent by the LIN Master, while the response is sent by either one dedicated LIN-Slave or the LIN master itself.

Transmitted data within the LIN is transmitted serially as eight-bit data bytes with one start bit, one stop-bit, and no parity (break field does not have a start bit and stop bit). Bit rates vary within the range of 1 kbit/s to 20 kbit/s, or more. Data on the bus is divided into recessive (logical HIGH) and dominant (logical LOW). The time normal is considered by the LIN Masters stable clock source, the smallest entity is one-bit time (e.g. 52 us at 19.2 kbit/s). Data may be transferred across the bus in fixed form messages of selectable lengths. The master task may transmit a header that consists of a break signal followed by synchronization and identifier fields. The slaves may respond with a data frame that consists of between 2, 4 and 8 data bytes plus 3 bytes of control information. Frame types include, unconditional frame, Event-triggered frame, Sporadic frame, Diagnostic frame, User-defined frame, Reserved frame. One example of a standard LIN is maintained by the International Organization for Standardization (ISO) as ISO/AWI 17987

"Memory" generally refers to any storage system or device configured to retain data or information. Each memory may include one or more types of solid-sate electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-sate electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM). Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips.

Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems.

Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as:

1. a central processing unit-ranging from small and simple processors with registers as small as 4 bits or list, to complex processors with registers that are 32, 64, or more bits
2. volatile memory (RAM) for data storage 3. ROM, EPROM, EEPROM or Flash memory for program and operating parameter storage
4. discrete input and output bits, allowing control or detection of the logic sate of an individual package pin
5. serial input/output such as serial ports (UARTs)
6. other serial communications interfaces like I2C, Serial Peripheral Interface and Controller Area Network for system interconnect
7. peripherals such as timers, event counters, PWM generators, and watchdog
8. clock generator-often an oscillator for a quartz timing crystal, resonator or RC circuit
9. many include analog-to-digital converters, some include digital-to-analog converters
10. in-circuit programming and in-circuit debugging support "Modulation" generally refers to a process of varying one or more properties of a signal using a separate signal that typically contains information to be transmitted. It may be thought of as merging the properties of two time-varying signals to create a third output signal that is the combination of both input signals. Modulation is useful in process of conveying data, such as in the case of transmitting a digital bit stream or an analog (continuously varying) signal using electromagnetic energy.

Analog modulation may transfer an analog baseband (or low pass) signal, for example an audio signal or TV signal, over an analog bandpass channel at a different frequency, for example over a limited radio frequency band or a cable TV network channel. Digital modulation may transfer a digital bit stream over an analog communication channel, for example over the public switched telephone network (where a bandpass filter limits the frequency range to 300-3400 Hz) or over a limited radio frequency band. Analog and digital modulation facilitate Frequency Division Multiplexing (FDM), where several low pass information signals are transferred simultaneously over the same shared physical medium, using different carrier frequencies. Digital baseband modulation, also known as "line coding", can transfer a digital bit stream over a baseband channel, typically a non-filtered copper wire such as a serial bus or a wired local area network. Pulse modulation may transfer a narrowband analog signal, for example, a phone call over a wideband baseband channel or, in some of the schemes, as a bit stream over another digital transmission system.

As used herein, analog modulation techniques may include, but is not limited to, any of the following alone or in combination:
1. Amplitude modulation (AM) (here the amplitude of the carrier signal is varied in accordance with the instantaneous amplitude of the modulating signal)
2. Double-sideband modulation with carrier (DSB-WC) (used on the AM radio broadcasting band)
4. Double-sideband suppressed-carrier transmission (DSB-SC)
5. Double-sideband reduced carrier transmission (DSB-RC)
6. Single-sideband modulation with carrier (SSB-WC)
8. Single-sideband modulation suppressed carrier modulation (SSB-SC)
9. Vestigial sideband modulation (VSB, or VSB-AM)
10. Quadrature amplitude modulation (QAM)
11. Frequency modulation (FM) (here the frequency of the carrier signal is varied in accordance with the instantaneous amplitude of the modulating signal)
13. Phase modulation (PM) (here the phase shift of the carrier signal is varied in accordance with the instantaneous amplitude of the modulating signal)
14. Transpositional Modulation (TM), in which the waveform inflection is modified resulting in a signal where each quarter cycle is transposed in the modulation process.

In digital modulation, an analog carrier signal may be modulated by a discrete signal. Digital modulation methods can be considered as digital-to-analog conversion and the corresponding demodulation or detection as analog-to-digital conversion. The changes in the carrier signal are chosen from a finite number of M alternative symbols (the modulation alphabet). As used herein, digital modulation techniques may include, but is not limited to, any of the following used either alone or in combination:
1. Binary PSK (BPSK), using M=2 symbols
2. Quadrature PSK (QPSK), using M=4 symbols
3. 8PSK, using M=8 symbols
4. 16PSK, using M=16 symbols
5. Differential PSK (DPSK)
6. Differential QPSK (DQPSK)
7. Offset QPSK (OQPSK)
8. T/4-QPSK
9. Audio frequency-shift keying (AFSK)
10. Multi-frequency shift keying (M-ary FSK or MFSK)
11. Dual-tone multi-frequency (DTMF)
12. Amplitude-shift keying (ASK)
13. On-off keying (OOK), the most common ASK form
14. M-ary vestigial sideband modulation, for example 8VSB
15. Quadrature amplitude modulation (QAM), a combination of PSK and ASK
16. Polar modulation like QAM a combination of PSK and ASK
17. Minimum-shift keying (MSK)
18. Gaussian minimum-shift keying (GMSK)
19. Continuous-phase frequency-shift keying (CPFSK)
20 Orthogonal frequency-division multiplexing (OFDM) modulation
21. Discrete multitone (DMT), including adaptive modulation and bit-loading
22. Wavelet modulation
23. Trellis coded modulation (TCM), also known as Trellis modulation
24. Direct-sequence spread spectrum (DSSS)
25. Chirp spread spectrum (CSS) according to IEEE 802.15.4a CSS uses pseudo-stochastic coding
26. Frequency-hopping spread spectrum (FHSS) applies a special scheme for channel release "Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11 (a), 802.11 (b), 802.11 (g), or 802.11 (n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPV6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Optionally" as used herein means discretionary; not required; possible, but not compulsory; left to personal choice.

"Optical Wireless Communications (OWC)" generally refers to a number of technologies that communication use light from light-emitting diodes (LEDs) as a medium to deliver network, mobile, or high-speed communication. One example of OWC is Li-Fi using any suitable wavelength of light.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, California, USA. Other examples of commercially available processors include but are not limited to the X8 and Freescale Coldfire processors made by Motorola Corporation of Schaumburg, Illinois, USA; the ARM processor and TEGRA System on a Chip (SoC) processors manufactured by Nvidia of Santa Clara, California, USA; the POWER7 processor manufactured by International Business Machines of White Plains, New York, USA; any of the FX, Phenom, Athlon, Sempron, or Opteron processors manufactured by Advanced Micro Devices of Sunnyvale, California, USA; or the Snapdragon SoC processors manufactured by Qalcomm of San Diego, California, USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Portion" means a part of a whole, either separated from or integrated with it.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Power Line Communication" (PLC) or generally refers to a system of electronic communication that transmits and receives signals on the same circuit used to transfer power. Examples including system that send data over common AC wiring in a home, or Broadband over Power Line (BPL) systems for carrying network traffic over high voltage transmission lines, as well as systems for in-vehicle communications.

In the vehicle context, data, voice, music and video signals may be transferred to throughout a vehicle by over direct current DC battery power-line. One example of is DC-BU, a technology for reliable and economical communication over noisy DC or AC power lines. Digital input data may be modulated and carried over the power line and then demodulated into the original digital data up receipt.

In DC-BUS or other PLC implementations, the signaling technology is byte oriented, allowing transfer of a single UART data byte or more over noisy channel (such as the powerline) at bit-rate up to 115.2 kbit/s, each transmitted byte is protected against errors caused by noisy environment. This method may operate on a channel ranging in the HF band. A narrow band signaling modulation may be used that is based on a combination of phase changes to transfer each byte. There is no restriction to the number of bytes. Any Universal Asynchronous Receiver-Transmitter (UART) based standards such as RS-232, RS-485 and LIN-bus can use a DC-BUS as a physical layer (as referred to in the OSI model).

"Sensor" generally refers to a transducer configured to sense or detect a characteristic of the environment local to the sensor. For example, sensors may be constructed to detect events or changes in quantities or sensed parameters providing a corresponding output, generally as an electrical or electromagnetic signal. A sensor's sensitivity indicates how much the sensor's output changes when the input quantity being measured changes.

"Sense parameter" generally refers to a property of the environment detectable by a sensor. As used herein, sense parameter can be synonymous with an operating condition, environmental factor, sensor parameter, or environmental condition. Sense parameters may include temperature, air pressure, speed, acceleration, the presence or intensity of sound or light or other electromagnetic phenomenon, the strength and/or orientation of a magnetic or electrical field, and the like.

"Signal" generally refers to a function or means of representing information. It may be thought of as the output of a transformation or encoding process. The concept generally includes a change in the state of a medium or carrier that conveys the information. The medium can be any suitable medium such as air, water, electricity, magnetism, or electromagnetic energy such as in the case of radio waves, pulses of visible or invisible light, and the like.

As used herein, a "signal" implies a representation of meaningful information. Arbitrary or random changes in the state of a carrier medium are generally not considered "signals" and may be considered "noise". For example, arbitrary binary data streams are not considered as signals. On the other hand, analog and digital signals that are representations of analog physical quantities are examples of signals. A signal is commonly not useful without some way to transmit or send the information, and a receiver responsive to the transmitter for receiving the information.

In a communication system, for example, a transmitter encodes a message to a signal, which is carried to a receiver by the communications channel. For example, the words "The time is 12 o'clock" might be the message spoken into a telephone. The telephone transmitter may then convert the sounds into an electrical voltage signal. The signal is transmitted to the receiving telephone by wires, at the receiver it is reconverted into sounds.

Signals may be thought of as "discrete" or "continuous." Discrete-time signals are often referred to as time series in other fields. Continuous-time signals are often referred to as continuous signals even when the signal functions are not continuous, such as in a square-wave signal.

Another categorization is signals which are "discrete-valued" and "continuous-valued". Particularly in digital signal processing a digital signal is sometimes defined as a sequence of discrete values, that may or may not be derived from an underlying continuous-valued physical process. In other contexts, digital signals are defined as the continuous-time waveform signals in a digital system, representing a bit-stream. In the first case, a signal that is generated by means of a digital modulation method may be considered as converted to an analog signal, while it may be considered as a digital signal in the second case.

"Rear biased" generally refers to being directed or biased toward the rear.

"Socket" generally refers a device into which something fits in order to electrically and/or physically connect another electrical device to a circuit.

"Stop-tail-turn Lamp" or "STT Lamp" generally refers to a lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Terminal" generally refers to a plug, socket or other connection (male, female, mixed, hermaphroditic, or otherwise) for mechanically and electrically connecting two or more wires or other conductors.

"Trailer" generally refers to a vehicle that is configured to be moved about using some other vehicle coupled to the trailer.

"Truck" generally refers to a powered truck (also known as a tractor or cab) for pulling a trailer.

"Ultraviolet light" generally refers to electromagnetic radiation at frequencies above those of visible light and just below those of X-rays. Ultraviolet frequencies range from about 750 THz to about 30 Petahertz (PHz), and wavelengths ranging between 750 nm and about 10 nm in length. Ultraviolet light is also classified as follows:

"Near ultraviolet" (NUV): Generally designates a band of frequencies from about 750 THz to about 1 PHz with wavelengths from about 400 nm to about 300 nm long.

"Middle ultraviolet" (MUV): Generally designates a band of frequencies from about 1 PHz to about 1.5 PHz with wavelengths from about 300 nm to about 200 nm long.

"Far ultraviolet" (FUV): Generally designates a band of frequencies from about 1.5 PHz to about 2.48 PHz with wavelengths from about 200 nm to about 122 nm long.

"Extreme ultraviolet" (EUV): Generally designates a band of frequencies from about 2.48 PHz to about 30 PHz with wavelengths from about 121 nm to about 10 nm long.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

"Visible light" generally refers to light visible to a human being. This is typically light in a band of frequencies from about 400 THz to about 750 THz with wavelengths from about 750 nm to about 400 nm long.

"Wavelength" generally refers to a property of a wave that is the distance between identical points between two successive waves. The distance between one crest (or trough) of one wave and the next is the wavelength of the wave. For example, with visible light, the wavelength determines the color, and with audible sound, the wave length determines the pitch.

What is claimed is:

1. A communication system for a truck and trailer, comprising:
   at least one trailer component mounted to the trailer;
   a modulation unit responsive to the at least one trailer component, wherein the modulation unit is configured to encode trailer-related data values representing operational aspects of the at least one trailer component sent to the modulation unit;
   a front-facing light emitter responsive to the modulation unit arranged and configured to direct forward-biased light away from the front of the trailer toward the rear of the truck, wherein the front-facing light emitter is configured to change at least one aspect of the forward-biased light according to the encoded trailer-related data values received from the modulation unit;
   a rear-facing light sensor mounted to the truck and facing toward the trailer and responsive to changes of the at least one aspect of the forward-biased light; and
   a demodulation unit mounted to the truck and responsive to the rear-facing light sensor, wherein the demodulation unit is configured to decode the trailer-related data values representing the operational aspects of the at least one trailer component;
   wherein power is supplied to the at least one trailer component through a power cable electrically connecting the at least one trailer component to a power source in the truck; and
   wherein the trailer-related data values include values indicating a status of the power supplied by the power cable to the at least one trailer component.

2. The communication system of claim 1, wherein the trailer-related data values include values indicating that the at least one trailer component is malfunctioning.

3. The communication system of claim 2, wherein the at least one trailer component is a vehicle tail lamp having multiple LEDs, and wherein the trailer-related data values include values indicating that at least a portion of the multiple LEDs has failed.

4. The communication system of claim 1, wherein the at least one trailer component includes one or more of a vehicle stop-tail-turn lamp, vehicle clearance lamp, vehicle turn signal lamp, vehicle brake lamp, vehicle tail lamp, vehicle running lamp, vehicle anti-lock brake system, vehicle interior illumination lamp, vehicle reverse lamp, pressure sensor, temperature sensor, door sensor, cargo sensor, cargo length sensor, liquid level sensor, refrigeration sensor, or any combination thereof.

5. The communication system of claim 1, wherein the front-facing light emitter includes an LED mounted to the front of the trailer arranged and configured to direct light toward the truck.

6. The communication system of claim 5, wherein the LED is part of a vehicle clearance lamp assembly mounted to the front of the trailer.

7. The communication system of claim 5, wherein the LED is configured to emit light that is visible to humans.

8. The communication system of claim 5, wherein the LED is configured to emit ultraviolet or infrared light, or any combination thereof.

9. The communication system of claim 1, wherein the at least one aspect of the light emitted by the front-facing light emitter is a wavelength of the forward-biased light.

10. The communication system of claim 1, wherein the at least one aspect of the light emitted by the front-facing light emitter changes according to current supplied to the front-facing light emitter.

11. The communication system of claim 1, wherein the at least one aspect of the light emitted by the front-facing light emitter is an intensity of the forward-biased light.

12. The communication system of claim 1, wherein the trailer-related data values are generated by a communication circuit in the at least one trailer component, and wherein the at least one trailer component is electrically connected to the modulation unit by a wire.

13. The communication system of claim 1, wherein the trailer-related data values are generated by a communication circuit in a socket electrically connecting the at least one trailer component to the modulation unit.

14. The communication system of claim 1, wherein the front-facing light emitter is arranged and configured to emit pulses of light in a sequence corresponding to the encoded trailer-related data values.

15. The communication system of claim 1, comprising:
   a truck controller configured to send command-related data values representing commands to the at least one trailer component;
   a second modulation unit responsive to the truck controller, wherein the second modulation unit is configured to encode command-related data values representing commands sent from the truck controller to be delivered to the at least one trailer component;
   a rear-facing light emitter arranged and configured to direct rear-biased light away from the rear of the truck toward the trailer, wherein the rear-facing light emitter is configured to change at least one aspect of the rear-biased light according to the encoded command-related data values received from the second modulation unit;
   a front-facing light sensor facing toward the rear of the truck and responsive to changes of the at least one aspect of the rear-biased light; and
   a second demodulation unit responsive to the front facing light sensor configured to decode the command-related data values representing the commands to the at least one trailer component.

16. The communication system of claim 1, comprising:
   a rear-facing light emitter configured to direct rear-biased light away from the rear of the trailer, wherein the rear-facing light emitter is responsive to the modulation unit.

17. The communication system of claim 16, wherein a second truck following behind the trailer has a front facing light sensor mounted on the second truck facing forward of the truck and toward the rear of the trailer and is responsive to changes of at least one aspect of the rear-biased light emitted away from the rear of the trailer.

18. The communication system of claim 17, wherein the front-facing light sensor is mounted in a lamp of the second truck.

19. The communication system of claim 17, comprising:
a truck controller configured to send truck-related data values representing information about the truck to the modulation unit, wherein the modulation unit is responsive to the truck controller, wherein the modulation unit is configured to encode truck-related data values representing the information about the truck sent to the modulation unit; and
wherein the rear-facing light emitter is configured to change at least one aspect of the rear-biased light according to the encoded truck-related data values representing information about the truck.

20. The communication system of claim 19, wherein the information about the truck includes any one or more of a speed of the truck, a change in speed of the truck, a level of braking applied, a gross vehicle weight of the truck and trailer, a load weight of the load in the trailer, a location of the truck, a route of the truck, or any combination thereof.

21. The communication system of claim 1, comprising:
an internal light emitter responsive to the modulation unit arranged and configured to direct internal light into an interior of the trailer, wherein the internal light emitter is configured to change at least one aspect of the internal light according to the encoded trailer-related data values received from the modulation unit;
an internal light sensor positioned inside the trailer and responsive to changes of the at least one aspect of the internal light; and
a demodulation unit responsive to the internal light sensor, wherein the demodulation unit is configured to decode the trailer-related data values representing the operational aspects of the at least one trailer component.

22. The communication system of claim 21, comprising:
a personal computing device inside the trailer, wherein the personal computing device includes the internal light sensor and the demodulation unit.

23. The communication system of claim 21, wherein the trailer-related data values include values indicating that the at least one trailer component is malfunctioning.

24. The communication system of claim 21, wherein the at least one trailer component is a vehicle tail lamp having multiple LEDs, and wherein the trailer-related data values include values indicating that at least a portion of the multiple LEDs has failed.

25. The communication system of claim 21, wherein the at least one trailer component includes one or more of a vehicle stop-tail-turn lamp, vehicle clearance lamp, vehicle turn signal lamp, vehicle brake lamp, vehicle tail lamp, vehicle running lamp, vehicle anti-lock brake system, vehicle interior illumination lamp, vehicle reverse lamp, pressure sensor, temperature sensor, door sensor, cargo sensor, cargo length sensor, liquid level sensor, refrigeration sensor, or any combination thereof.

26. The communication system of claim 21, wherein the internal light emitter includes an LED mounted inside the trailer as part of an interior trailer lamp assembly.

27. The communication system of claim 21, wherein the internal light emitter includes an LED configured to emit light that is visible to humans.

28. The communication system of claim 22, wherein the internal light emitter includes an LED configured to emit infrared light.

* * * * *